(12) United States Patent
Ropolyi et al.

(10) Patent No.: US 8,607,309 B2
(45) Date of Patent: Dec. 10, 2013

(54) TRUSTWORTHINESS DECISION MAKING FOR ACCESS AUTHENTICATION

(75) Inventors: Robert Ropolyi, Victoria (AU); Guenther Horn, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 71 days.

(21) Appl. No.: 13/128,515

(22) PCT Filed: Jan. 5, 2009

(86) PCT No.: PCT/EP2009/050053
§ 371 (c)(1),
(2), (4) Date: May 10, 2011

(87) PCT Pub. No.: WO2010/076044
PCT Pub. Date: Jul. 8, 2010

(65) Prior Publication Data
US 2011/0225632 A1    Sep. 15, 2011

(51) Int. Cl.
*H04L 29/06* (2006.01)
(52) U.S. Cl.
USPC .................................. 726/3; 726/4; 380/247
(58) Field of Classification Search
None
See application file for complete search history.

(56) References Cited

FOREIGN PATENT DOCUMENTS

WO    2008/155066    12/2008

OTHER PUBLICATIONS

3GPP TS 29.273 V1.2.0, "3rd Generation Partnership Project; Technical Specification Group Core Network and Terminals; Evolved Packet System; 3GPP EPS AAA Interfaces (Releases 8)", Nov. 2008, pp. 1-79.
Nokia Siemens Networks et al., "STa/SWa Clarifications", C4-091005, Change Request 29.273 CR 0035 rev 4 Current Version 8.0.0, 3GPP TSG CT Meeting #42, Feb. 2009, pp. 1-22.
Nokia Siemens Networks et al., "Signalling VPLMN Trust of non-3GPP AN", C4-090848, 3GPP TSG CT WG4 Meeting #42, Change Request 29.273 rev 1, Current Version 8.0.0, Feb. 2009, pp. 1-10.
C1-085334, 3GPP TSG CT WG1 Meeting #56, "Pseudo-CR on Trusted/Untrusted Access Detection in Section 6.2.4" Panasonic, Nov. 2008, pp. 1-2.
C1-084973, 3GPP TSG WG1 Meeting #56, "Pseudo CR on Trusted/Untrusted Access Detection in Section 6.2.4", Panasonic, Nov. 2008, pp. 1-2.
3GPP TS 23.003 V8.2.0, "3rd Generation Partnership Project; Technical Specification Group Core Network and Terminals; Numbering, Addressing and identification (Release 8)", Sep. 2008, pp. 1-67.
Russ Housley, Improved Extensible Authentication Protocol Method for 3rd Generation Authentication an Key Agreement (EAP-AKA'), RFC 5448, Nov. 18, 2008, one page.
On Supporting Trusted/Untrusted Access, 3GPP TSG SA WG2 Meeting #64b adhoc and #65, May 7-9, 2008, Munich, Germany, May 12-16, 2008, Prague, Caech Rebublic, TD S2-083477, a total of 3 pages.

(Continued)

*Primary Examiner* — Minh Dinh
(74) *Attorney, Agent, or Firm* — Squire Sanders (US) LLP

(57) ABSTRACT

There are provided measures for trustworthiness decision making for access authentication, for example relating to the trustworthiness of non-3GPP access networks within a 3GPP-compliant packet data system, exemplary comprising receiving an indication about a provisional trustworthiness of an access network, which provides packet data access for a roaming user, with respect to a visited network of said user from a network element of said visited network, determining the applicability of local breakout or home routing for each subscribed access point name of said user, and deciding about a final trustworthiness of said access network based upon the received provisional trustworthiness indication and the determined routing applicability for each subscribed access point name of said user.

22 Claims, 12 Drawing Sheets

(56) References Cited

OTHER PUBLICATIONS

3rd Generation Partnership Project; Technical Specification Group Services and System Aspects; Architecture enhancements for non-3GPP accesses (Release 8), 3GPP TS 23.402 V8.4.1., Jan. 2009, pp. 1-191.

3rd Generation Partnership Project; Technical Specification Group Core Network and Terminals; Access to the 3GPP Evolved packet Core (EPC) via non-3GPP access networks; Stage 3; (Release 8), 3GPP TS 24.302 V1.2.0 (Nov. 2008), pp. 1-41.

3rd Generation Partnership Project; Technical Specification Group Core Network and Terminals; Access to the 3GPP Evolved Packet core (EPC) via non-3GPP access networks; Stage 3; (Release 8), 3GPP TS 24.302 V1.2.0 (Nov. 2008), pp. 1-47.

3rd Generation Partnership Project; Technical Specification Group Core Network and Terminals; Evolved Packet System (EPS); 3GPP EPS AAA interfaces (Release 8), 3GPP TS 29.273 V8.0.0 (Dec. 2008), pp. 1-77.

3rd Generation Partnership Project; Technical Specification Group Services and System Aspects; 3G Security; Network Domain Security; IP network layer security (Release 8), 3GPP TS 33.210 V8.2.0 (Dec. 2008), pp. 1-23.

3rd Generation Partnership Project; Technical Specification Group Service and System Aspects; 3G Security; Wireless Local Area Network (WLAN) interworking security (Release 8), 3GPP TS 33.234 V8.1.0 (Mar. 2008), pp. 1-101.

3rd Generation Partnership project; Technical Specification Group Services and System Aspects; 3GPP System Architecture Evolution (SAE); Security aspects of non-3GPP accesses; (Release 8), 3GPP TS 33.402 V8.2.1 (Dec. 2008), pp. 1-41.

B. Aboba et al., Extensible Authentication Protocol (EAP), Network Working Group, RFC 3748, Jun. 2004, pp. 1-67.

J. Arkko et al., Extensible Authentication Protocol Method for 3rd Generation Authentication and Key Agreement (EAP-AKA), Network Working Group, RFC 4187, Jan. 2006, pp. 1-79.

TRUSTWORTHINESS DECISION MAKING FOR ACCESS AUTHENTICATION

FIELD OF THE INVENTION

The present invention generally relates to trustworthiness decision making for access authentication. For example, the present invention relates to access authentication with respect to the trustworthiness of non-3GPP access networks within a 3GPP-compliant packet data system.

BACKGROUND OF THE INVENTION

In recent years, the convergence of communication systems and subsystems has attracted an increasing attention in communication technology. In this context, different systems in terms of communication technology, protocols, and/or principles as well as different subsystems thereof (e.g. access networks, core networks, or the like) are to be converged into an overall system framework. However, there are several issues in converging different systems and/or subsystems into a common overall system framework, and the operation of thus converged overall system frameworks.

One issue in the context of communication system convergence resides in the interworking between access networks and core networks. In such a system configuration, security issues may arise, for example the question of trustworthiness of an access network from the point of view of a core network or a user's home network or a user's visited network (in case of roaming).

In the following, a system configuration will exemplary be addressed, in which a core network and/or home network and/or a visited network (in case of roaming) comply with a specific standard specification, for example a 3GPP (Third Generation Partnership Project) specification, but at least one access network via which a user equipment connects to the 3GPP core/home/visited network does not comply with a 3GPP standard specification. Such an access network is called a non-3GPP access network. It may comply with other standards, e.g. the HRPD standard defined by 3GPP2 or the WiMAX standard defined by the WiMAX Forum. It is to be noted that such a system configuration is taken as a non-limiting example, while similar system configurations are equally applicable as well.

As a non-limiting example for the following description, it is assumed that a user equipment is connected to a 3GPP evolved packet system (EPS) via a non-3GPP (e.g. HRPD (High Rate Packet Data) or WiMAX (Worldwide Interoperability for Microwave Access)) access network. Communication connectivity, e.g. Internet Protocol (IP) connectivity, is provided to the user equipment connecting to the EPC via the non-3GPP access networks in accordance with 3GPP standard specifications, such as 3GPP TS23.402 and 3GPP TS24.302. The security requirements and the requested authentication methods for trusted and untrusted non-3GPP access networks, as well as AAA (authentication, authorization and accounting) interfaces and procedures for the non-3GPP access network are also in accordance with 3GPP standard specifications, such as 3GPP TS33.402 and 3GPP TS29.273. Known authentication mechanisms such as EAP methods, e.g. EAP-AKA and EAP-AKA' (EAP: Extensible Authentication Protocol, AKA: Authentication and Key Agreement) are applicable in accordance with 3GPP standard specifications. In the present non-limiting example, it is also assumed that the user equipment is roaming, i.e. is connected to its home network via a non-3GPP access network, which is attached to a visited 3GPP-compliant network.

During initial attach or handover to a non-3GPP access network, a decision as to whether the access network is trusted or untrusted is to be made in the user's home network, for example by an AAA server residing in the HPLMN (home public land mobile network). This decision shall take into account business/administrative conditions (e.g. direct roaming agreement with the operator of the access network) and technical conditions. Necessary or relevant technical conditions are dependent on the underlying network scenario and/or utilized protocols.

For example, according to current standard specifications, the following technical conditions are applicable for the S2a interface (between an access network and a packet data network gateway) using network-based mobility, i.e. Proxy Mobile IP (PMIP) as IP mobility management protocol. The MAG (Mobile Access Gateway) shall be trusted by the LMA (Local Mobility Anchor) to register only those Mobile Nodes that are attached. Security for PMIP messages between MAG and LMA shall be provided either by a chain of security associations in a hop-by-hop fashion (for each hop in such a chain, one security association per direction shall be used for all PMIP messages relating to any user), or by one security association per direction for all PMIP messages relating to any user in an end-to-end fashion for the intra-domain case. PMIP shall be used only in conjunction with EAP-AKA-based access authentication.

For example, according to current standard specifications, the following technical conditions are applicable for the S2c interface (between a user equipment and a packet data network gateway) using host-based mobility, i.e. Dual Stack Mobile IPv6 (DSMIPv6) as IP mobility management protocol. An access network needs to fulfill several security requirements to be trusted when host-based mobility is used. The trusted access will authenticate the user equipment and provide a secure link for the data to be transferred from the user equipment to the trusted access. The trusted access protects against source IP address spoofing. The trusted access and the packet data network gateway (PDN GW) will have a secure link between them to transfer the user's data across. The trusted access and the evolved packet core (EPC) need to co-ordinate when the user equipment detaches from the trusted access in order to ensure that the IP address that was assigned to the user equipment is not be used by another user equipment without EPC being aware of the change (i.e. enable the PDN GW to remove the CoA (care-of-address) binding for the old user equipment).

These sets of conditions, which are specified according to current standard specifications, are quite general, however, and additional information may be required to determine whether an access network is trusted or not. At present, it is up to each operator to determine a full set of business (administrative) and technical conditions which need to be met for an access network to be trusted.

Therefore, in order that the making of a correct decision on the trustworthiness of an access network is feasible at the user's home network, all relevant information (for example, current data for all relevant conditions) need to be available at the home network. However, this will be particularly difficult to be ensured in a roaming case.

In this regard, it is to be noted that a packet data network gateway (PDN GW) may be dynamically allocated during an authentication procedure. Therefore, for example in terms of a condition of a secure IP link between a non-3GPP access gateway and the PDN GW, the IP link in question can be between the non-3GPP access network and the home network (in case home routing is selected, i.e. the PDN GW is located in the home network) or between the non-3GPP access network and the visited network (in case local breakout is selected, i.e. the PDN GW is located in the visited network).

Considering that the IP routing is made directly between the two networks (i.e. the access network and the home or visited network), the IP link may use different routes and different IP transport providers (e.g. network operators) for the cases of home routing and local breakout (LBO) case. Consequently, the security aspects concerning the respective IP links may also be different, thus hampering the availability of proper information for decision making at the home network.

According to current standard specifications, there is no mechanism as to how the home network could obtain all the relevant information needed to make its decision on the trust status (i.e. trustworthiness) of the access network, for example about the security of the IP link between the non-3GPP access network and the PDN GW that resides in the visited network, if local breakout is selected. Considering that there may be several hundred roaming partners e.g. for a GSM (Global System for Mobile Communication) and/or UTRAN (Universal Terrestrial Radio Access Network) network operator, which are scattered all over the world, and the number of non-3GPP accesses may be even higher, it is not feasible that the home network has up-to-date information about all IP links between all of the access networks and the potential visited networks, as required especially in roaming cases.

Therefore, the home network may make a wrong decision, not correctly taking into account all relevant conditions, e.g. the security of the link to be used. If the home network decides for the access network being untrusted, even though this would not be required, this will lead to unnecessary resource consumption and/or time delay. For example, an evolved packet data gateway (ePDG) may be unnecessarily involved in the communication path, and a tunnel setup procedure between user equipment and ePDG may be unnecessarily executed. In case the home network decides for the access network being trusted, even though there is e.g. no secure IP link between the access network and the visited network, this will lead to a break of confidentiality requirements, and thus e.g. eavesdropping may become possible.

Accordingly, there does not exist any feasible solution for ensuring secure and efficient access procedures based on the availability of information relating to the trustworthiness of access networks within a packet data system.

SUMMARY OF EMBODIMENTS OF THE INVENTION

The present invention and its embodiments are made to provide for a feasible solution for ensuring secure and efficient access procedures based on the availability of information relating to the trustworthiness of access networks within a packet data system.

According to an exemplary first aspect of the present invention, there is provided a method comprising receiving an indication about a provisional trustworthiness of an access network, which provides packet data access for a roaming user, with respect to a visited network of said user from a network element of said visited network, determining the applicability of local breakout or home routing for each subscribed access point name of said user, and deciding about a final trustworthiness of said access network based upon the received provisional trustworthiness indication and the determined routing applicability for each subscribed access point name of said user.

According to further developments or modifications thereof, one or more of the following applies:

said receiving of the provisional trustworthiness indication comprises receiving an attribute in an authentication request, which is configured to indicate the provisional trustworthiness of said access network, the authentication request comprises a Diameter Extensible Authentication Protocol request, said determining yields the applicability of local breakout for all subscribed access point names of said user, said deciding further comprising accepting the provisional trustworthiness of said access network in terms of technical decision factors, and considering administrative decision factors, if any, for making an ultimate decision about the final trustworthiness of said access network, said determining yields the applicability of home routing for all subscribed access point names of said user, said deciding further comprising discarding the provisional trustworthiness of said access network with respect to said visited network, and considering technical and, if any, administrative decision factors with respect to a home network of said user for making an ultimate decision about the final trustworthiness of said access network, said decision factors comprise technical decision factors including one or more of a radio access technology of said access network and a security level of a link between said access network and said visited network of said user, as well as administrative decision factors including one or more of the existence of a roaming agreement between said access network and said home network, a trust level between said visited network and said home network, previous experience on service quality, said determining yields the applicability of local breakout for some of the subscribed access point names of said user and the applicability of home routing for other subscribed access point names of said user, said deciding further comprising making sub-decisions for those subscribed access point names yielding the applicability of local breakout and for those subscribed access point names yielding the applicability of home routing, and combining the sub-decisions made for both groups of access point names such that said access network is decided to be finally trustworthy, when said access network has been decided to be trustworthy for both groups of access point names, said determining yields the applicability of local breakout for some of the subscribed access point names of said user and the applicability of home routing for other subscribed access point names of said user, said deciding further comprising making separate decisions for those subscribed access point names yielding the applicability of local breakout and for those subscribed access point names yielding the applicability of home routing, and informing the user about the separate decisions of final trustworthiness of the access network with regard to the individual subscribed access point names of said user, said network element of said visited network comprises an authentication, authorization and accounting proxy entity, and/or packet data access is provided via an interface between said access network and a packet data network gateway, and/or IP mobility management is provided using Proxy Mobile Internet Protocol or Dual-Stack Mobile IP version 6.

said network element of said visited network comprises an evolved packet data gateway, and/or packet data access is provided via an interface between said user and a packet data network gateway, and/or IP mobility management is provided using Dual-Stack Mobile Internet Protocol version 6, said method is operable upon initial attach at or handover to said access network, said visited network and a home network of said user belong to an evolved packet system in accordance with 3GPP specifications, and said access network is a non-3GPP access network, and/or said method is operable at an authentication, authorization and accounting server in said home network of said user.

According to an exemplary second aspect of the present invention, there is provided a method comprising receiving information about separate decisions of trustworthiness of an access network, which provides packet data access for a roaming user, regarding individual subscribed access point names of said user, from a network element of a home network of said user, and requesting packet data network connections using respective access point names depending on the received trustworthiness of the access network regarding the individual subscribed access point names.

According to further developments or modifications thereof, one or more of the following applies:

said requesting further comprises for access point names, for which an indication is received that the access network can be considered as trustworthy, sending a packet data network connection request to a non-3GPP gateway, if Proxy Mobile Internet Protocol is used, or setting up a security association and sending a packet data network connection request to a packet data network gateway, if Dual-Stack Mobile Internet Protocol version 6 is used, and/or for access point names, for which an indication is received that the access network is to be considered as non-trustworthy, sending packet data network connection requests embedded into a secure tunnel setup to an evolved packet gateway, if Proxy Mobile Internet Protocol is used, and/or setting up a tunnel to an evolved packet data gateway and setting up a security association and sending a packet data network connection request to a packet data network gateway via said tunnel to said evolved packet data gateway, if Dual Stack Mobile IP version 6 is used, said network element of said home network comprises an authentication, authorization and accounting server, and/or said method is operable at a user equipment of said user.

According to an exemplary third aspect of the present invention, there is provided a method comprising evaluating a trust relationship between an access network, which provides packet data access for a roaming user, and a visited network of said user by taking into account available decision factors for trustworthiness, deciding about a trustworthiness of said access network with respect to said visited network based upon the evaluated trust relationship, and transmitting an indication about said decided trustworthiness to a network element of a home network of said user.

According to further developments or modifications thereof, one or more of the following applies:

said decision factors comprise technical decision factors including one or more of a radio access technology of said access network and a security level of a link between said access network and said visited network of said user, said transmitting the trustworthiness indication comprises sending an attribute in an authentication request, which is configured to indicate the provisional trustworthiness of said access network, the authentication request comprises a Diameter Extensible Authentication Protocol request, said method is operable at an authentication, authorization and accounting proxy entity, and/or packet data access is provided via an interface between said access network and a packet data network gateway, and/or IP mobility management is provided using Proxy Mobile Internet Protocol, and/or said method is operable at an evolved packet data gateway, and/or packet data access is provided via an interface between said user and a packet data network gateway, and/or IP mobility management is provided using Dual-Stack Mobile Internet Protocol version 6, According to an exemplary fourth aspect of the present invention, there is provided an apparatus comprising a receiver configured to receive an indication about a provisional trustworthiness of an access network, which provides packet data access for a roaming user, with respect to a visited network of said user from a network element of said visited network, a determiner configured to determine the applicability of local breakout or home routing for each subscribed access point name of said user, and a decider configured to decide about a final trustworthiness of said access network based upon the received provisional trustworthiness indication and the determined routing applicability for each subscribed access point name of said user.

According to further developments or modifications thereof, one or more of the following applies:

said receiver is configured to receive an attribute in an authentication request, which is configured to indicate the provisional trustworthiness of said access network, the authentication request comprises a Diameter Extensible Authentication Protocol request, when said determiner yields the applicability of local breakout for all subscribed access point names of said user, said decider is further configured to accept the provisional trustworthiness of said access network in terms of technical decision factors, and consider administrative decision factors, if any, for making an ultimate decision about the final trustworthiness of said access network, when said determiner yields the applicability of home routing for all subscribed access point names of said user, said decider is further configured to discard the provisional trustworthiness of said access network with respect to said visited network, and consider technical and, if any, administrative decision factors with respect to a home network of said user for making an ultimate decision about the final trustworthiness of said access network, when said determiner yields the applicability of local breakout for some of the subscribed access point names of said user and the applicability of home routing for other subscribed access point names of said user, said decider is further configured to make sub-decisions for those subscribed access point names yielding the applicability of local breakout and for those subscribed access point names yielding the applicability of home routing, and combine the sub-decisions made for both groups of access point names such that said access network is decided to be finally trustworthy, when said access network is decided to be trustworthy for both groups of access point names.

when said determiner yields the applicability of local breakout for some of the subscribed access point names of said user and the applicability of home routing for other subscribed access point names of said user, said decider is further configured to make separate decisions for those subscribed access point names yielding the applicability of local breakout and for those subscribed access point names yielding the applicability of home routing, and inform the user about the separate decisions of final trustworthiness of the said access network with regarding to the individual subscribed access point names of said user, said network element of said visited network comprises an authentication, authorization and accounting proxy entity, and/or packet data access is provided via an interface between said access network and a packet data network gateway, and/ or IP mobility management is provided using Proxy Mobile Internet Protocol or Dual-Stack Mobile IP version 6, said network element of said visited network comprises an evolved packet data gateway, and/or packet data access is provided via an interface between said user and a packet data network gateway, and/or IP mobility management is provided using Dual-Stack Mobile Internet Protocol version 6, said apparatus is operable upon initial attach at or handover to said access network, said visited network and a home network of said user belong to an evolved packet system in accordance with 3GPP specifications, and said access network is a non-3GPP access network, and/or said apparatus is operable as an authentication, authorization and accounting server in said home network of said user.

According to an exemplary fifth aspect of the present invention, there is provided an apparatus comprising a receiver configured to receive information about separate decisions of trustworthiness of an access network, which provides packet data access for a roaming user, regarding individual subscribed access point names of said user from a network element of a home network of said user, and a requester configured to request packet data network connections using respective access point names depending on the received trustworthiness of the access network regarding the individual subscribed access point name.

According to further developments or modifications thereof, one or more of the following applies:

said requester is further configured to, for access point names, for which an indication is received that the access network can be considered as trustworthy, send a packet data network connection request to a non-3GPP gateway, if Proxy Mobile Internet Protocol is used, or set up a security association and send a packed data network connection request to a packet data network gateway, if Dual-Stack Mobile Internet Protocol version 6 is used, and/or, for access point names, for which an indication is received that the access network has to be considered as non-trustworthy, send packet data network connection requests embedded into a secure tunnel setup to an evolved packet gateway, if Proxy Mobile Internet Protocol is used, and/or set up a tunnel to an evolved packet data gateway and set up a security association and send a packet data network connection request to a packet data network gateway via said tunnel to said evolved packet data gateway, if Dual Stack Mobile IP version 6 is used, said network element of said home network comprises an authentication, authorization and accounting server, and/or said apparatus is operable as a user equipment of said user.

According to an exemplary sixth aspect of the present invention, there is provided an apparatus comprising an evaluater configured to evaluate a trust relationship between an access network, which provides packet data access for a roaming user, and a visited network of said user by taking into account available decision factors for trustworthiness, a decider configured to decide about a trustworthiness of said access network with respect to said visited network based upon the evaluated trust relationship, and a transmitter configured to transmit an indication about said decided trustworthiness to a network element of a home network of said user.

According to further developments or modifications thereof, one or more of the following applies:

said decision factors comprise technical decision factors including one or more of a radio access technology of said access network and a security level of a link between said access network and said visited network of said user, said transmitter is further configure to send an attribute in an authentication request, which is configured to indicate the provisional trustworthiness of said access network, the authentication request comprises a Diameter Extensible Authentication Protocol request.

said apparatus is operable as an authentication, authorization and accounting proxy entity, and/or packet data access is provided via an interface between said access network and a packet data network gateway, and/or IP mobility management is provided using Proxy Mobile Internet Protocol or Dual-Stack Mobile Internet Protocol version 6, said apparatus is operable as an evolved packet data gateway, and/or packet data access is provided via an interface between said user and a packet data network gateway, and/or packet data mobility is provided using Dual-Stack Mobile Internet Protocol version 6.

According to an exemplary seventh aspect of the present invention, there is provided a computer program product comprising program code means being arranged, when run on a processor of an apparatus, to perform the method according to the first aspect and/or one or more developments/modifications thereof.

According to an exemplary eighth aspect of the present invention, there is provided a computer program product comprising program code means being arranged, when run on a processor of an apparatus, to perform the method according to the second aspect and/or one or more developments/modifications thereof.

According to an exemplary ninth aspect of the present invention, there is provided a computer program product comprising program code means being arranged, when run on a processor of an apparatus, to perform the method according to the third aspect and/or one or more developments/modifications thereof.

By way of exemplary embodiments of the present invention, there is provided a feasible solution for ensuring secure and efficient access procedures based on the availability of information relating to the trustworthiness of access networks within a packet data system, particularly with respect to the trustworthiness of non-3GPP access networks within a 3GPP-compliant packet data system.

By way of exemplary embodiments of the present invention, there is provided that in all cases (including home routing and local breakout, different interfaces, etc.) a home network (e.g. a AAA server in the home network) is able to determine whether the conditions for an access network to be trusted are met or not. According to embodiments of the present invention, this is also accomplished for roaming cases, when the access network is connected to a packet data network gateway (PDN GW) which is located in a visited network. Stated in other words, there is provided a feasible solution for conveying all the relevant information (e.g. from the visited network) to the home network where the decision needs to be made.

By way of exemplary embodiments of the present invention, there are provided more efficient measures for IP connectivity using a non-3GPP access network, for example improving resource usage.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
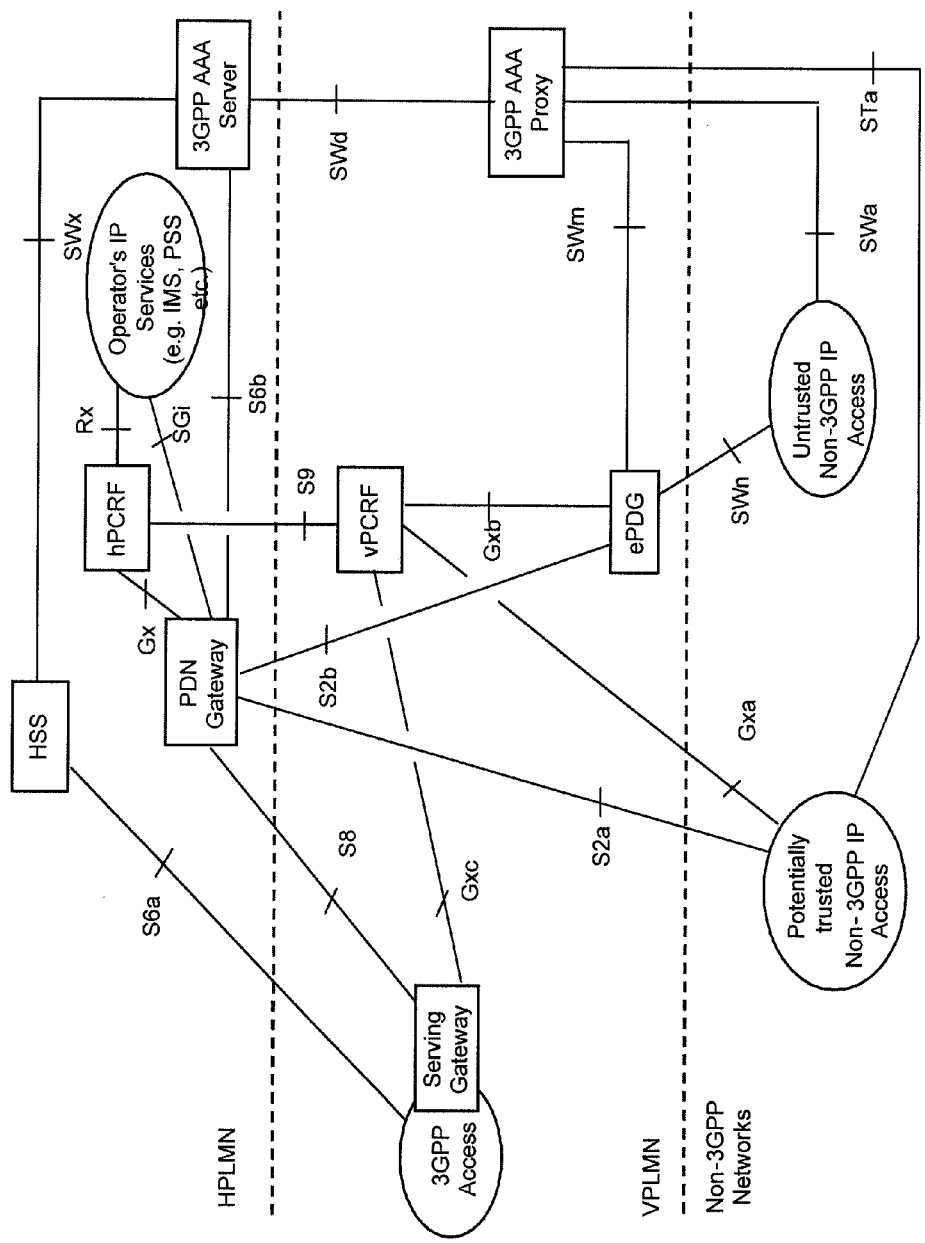
FIG. 1 shows a schematic block diagram of a network configuration in case of home routing using the S2a interface, in which embodiments of the present invention are applicable.

The present invention is described herein with reference to particular non-limiting examples. A person skilled in the art will appreciate that the invention is not limited to these examples, and may be more broadly applied.

In particular, the present invention and its embodiments are mainly described in relation to 3GPP standard specifications being used as non-limiting examples for certain exemplary network configurations. In particular, non-3GPP access networks (ANs) in connection with 3GPP-compliant core networks (e.g. home and/or visited networks), i.e. a 3GPP evolved packet system, are used as a non-limiting example in this regard. As such, the description of the embodiments given herein specifically refers to terminology which is directly related thereto. Such terminology is only used in the context of the presented non-limiting examples, and does naturally not limit the invention in any way. Rather, any other network configuration or implementation may also be utilized as long as being in line with the features described herein.

In the following, various embodiments and implementations of the present invention and its aspects are described using several alternatives. It is generally to be noted that, according to certain needs and constraints, all of the described alternatives may be provided alone or in any conceivable combination (also including combinations of individual features of the various alternatives).

In most generic terms, in accordance with the illustrative examples outlined above, principles of the present invention are based on the visited (VPLMN: visited public land mobile network) network, e.g. the 3GPP AAA Proxy or the evolved packet data gateway (ePDG) therein, assessing the non-3GPP access network being trusted or untrusted and signaling this to the home (HPLMN) network, e.g. the 3GPP AAA server therein. This assumes that the HPLMN trusts the information provided by the VPLMN, but this trust between the HPLMN and the VPLMN may be assumed anyhow as the HPLMN has selected the VPLMN as a roaming partner. If local breakout (LBO) is selected during the authentication and authorization process, the AAA Server shall take into account the trusted/untrusted indication received from the VPLMN. This does not mean an automatic acceptance, namely the HPLMN operator shall have the right to make an "untrusted" decision even though the VPLMN has indicated a "trusted" decision and LBO is selected. One reason for that may be that the HPLMN and VPLMN operators have different judgments of the security ensured by a certain radio access type.

As a first alternative in line with the present invention, embodiments of the present invention may be implemented using an interface between a non-3GPP access network and the 3GPP AAA Proxy, which may be referred to as STa interface, and the interface between the 3GPP AAA Proxy and the 3GPP AAA Server, which can be referred to as SWd interface, in accordance with present exemplary network configurations. The so-called S2a/S2b/S2c interfaces shall be used for user plane communication, wherein this is decided by IP mobility mode selection (note that the S2b interface is used only, if a trust decision as explained below is "untrusted").

FIG. 1 shows a schematic block diagram of a network configuration in case of home routing using the S2a interface, in which embodiments of the present invention are applicable.

According to FIG. 1, non-3GPP access networks (for example, one being denoted as (potentially) trusted and one being denoted as untrusted) are connected to a home network HPLMN of a user (i.e. a user equipment) via a visited network VPLMN, which is due to the assumption of a roaming case. The roaming user equipment is not shown, but is provided with packet data access by any one of the thus depicted non-3GPP access networks. Since a home routing (HR) scenario is assumed in FIG. 1, the PDN gateway is located in the home network. For further details of the thus depicted network configuration, reference is made to 3GPP TS 23.402.

Figure 2:
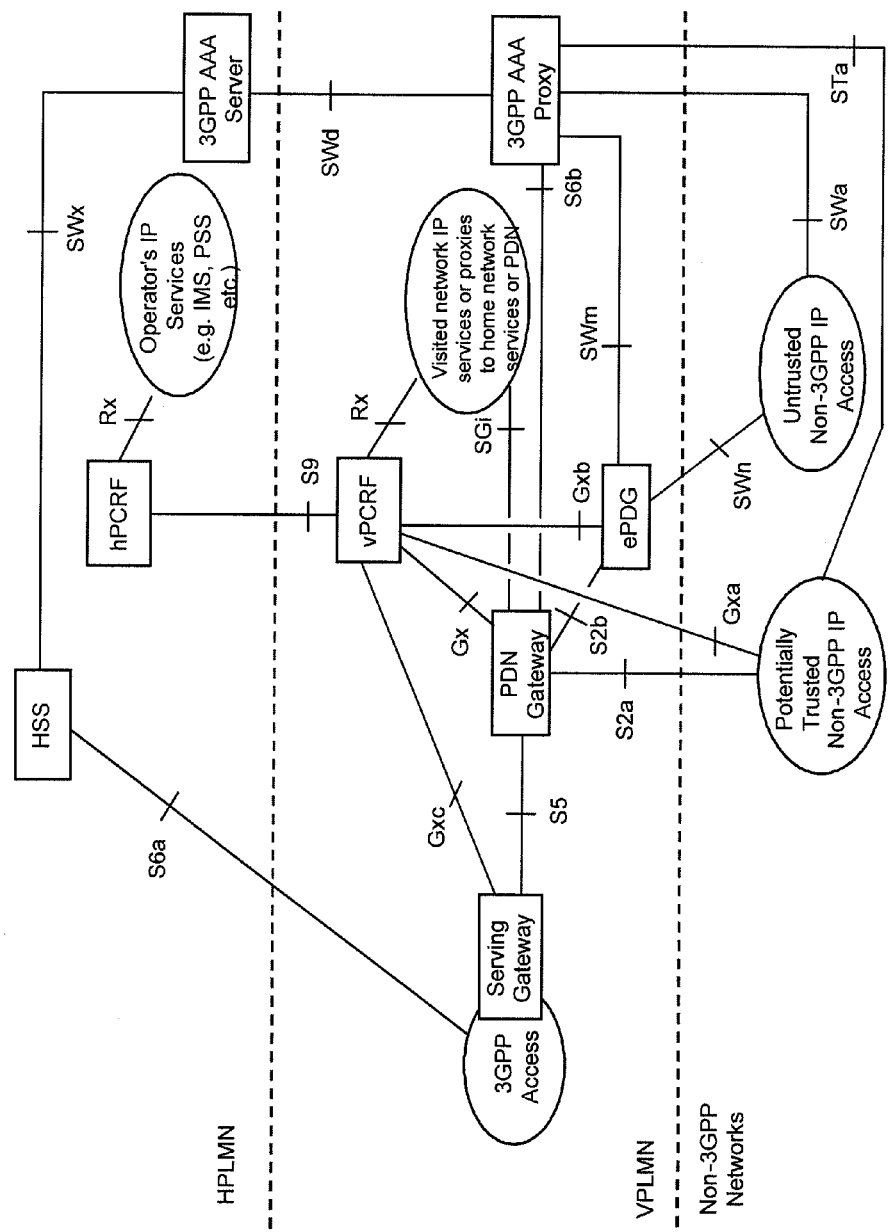
FIG. 2 shows a schematic block diagram of a network configuration in case of local breakout using the S2a interface, in which embodiments of the present invention are applicable.

FIG. 2 shows a schematic block diagram of a network configuration in case of local breakout using the S2a interface, in which embodiments of the present invention are applicable.

According to FIG. 2, a similar network configuration as that of FIG. 1 is illustrated, but differs in that a local breakout (LBO) scenario is assumed. Hence, the PDN gateway is located in the visited network.

Figure 3:
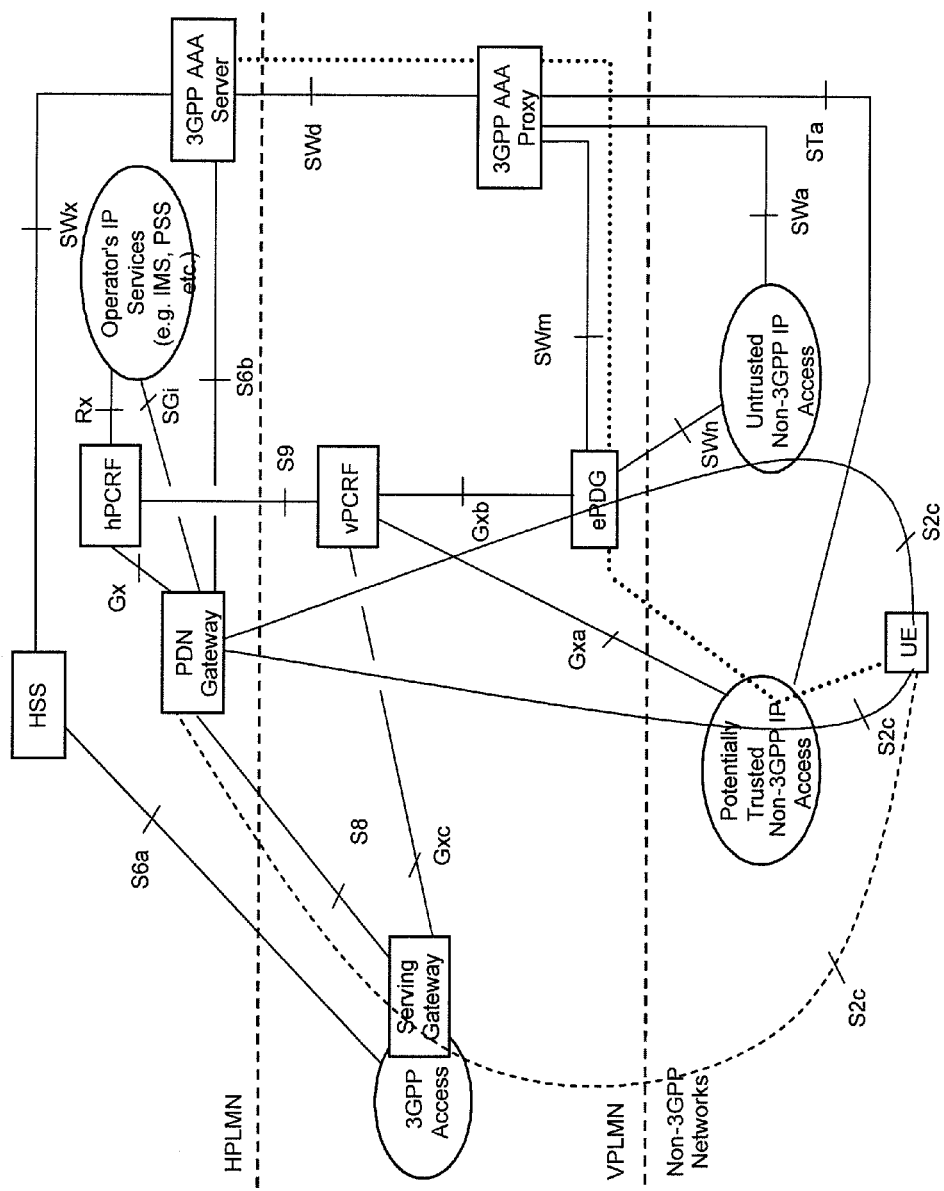
FIG. 3 shows a schematic block diagram of a network configuration in case of home routing using the S2c interface, in which embodiments of the present invention are applicable.

FIG. 3 shows a schematic block diagram of a network configuration in case of home routing using the S2c interface, in which embodiments of the present invention are applicable.

According to FIG. 3, non-3GPP access networks (for example, one being denoted as (potentially) trusted and one being denoted as untrusted) are connected to a home network HPLMN of a user (i.e. a user equipment) via a visited network VPLMN, which is due to the assumption of a roaming case. The roaming user equipment is provided with packet data access by any one of the thus depicted non-3GPP access networks. Since a home routing scenario is assumed in FIG. 3, the PDN gateway is located in the home network. For further details of the thus depicted network configuration, reference is made to 3GPP TS 23.402.

Figure 4:
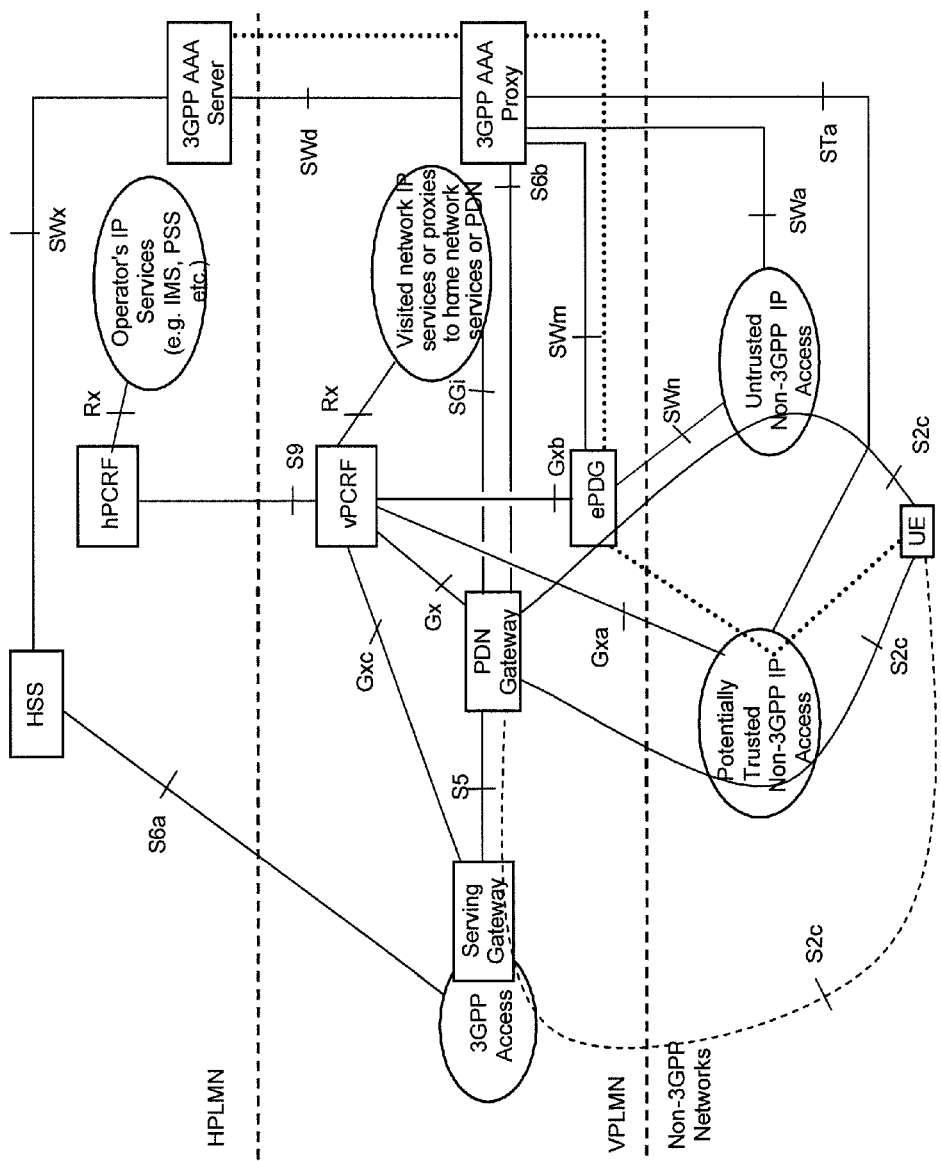
FIG. 4 shows a schematic block diagram of a network configuration in case of local breakout using the S2c interface, in which embodiments of the present invention are applicable.

FIG. 4 shows a schematic block diagram of a network configuration in case of local breakout using the S2c interface, in which embodiments of the present invention are applicable.

According to FIG. 4, a similar network configuration as that of FIG. 3 is illustrated, but differs in that a local breakout (LBO) scenario is assumed. Hence, the PDN gateway is located in the visited network.

Figure 5:
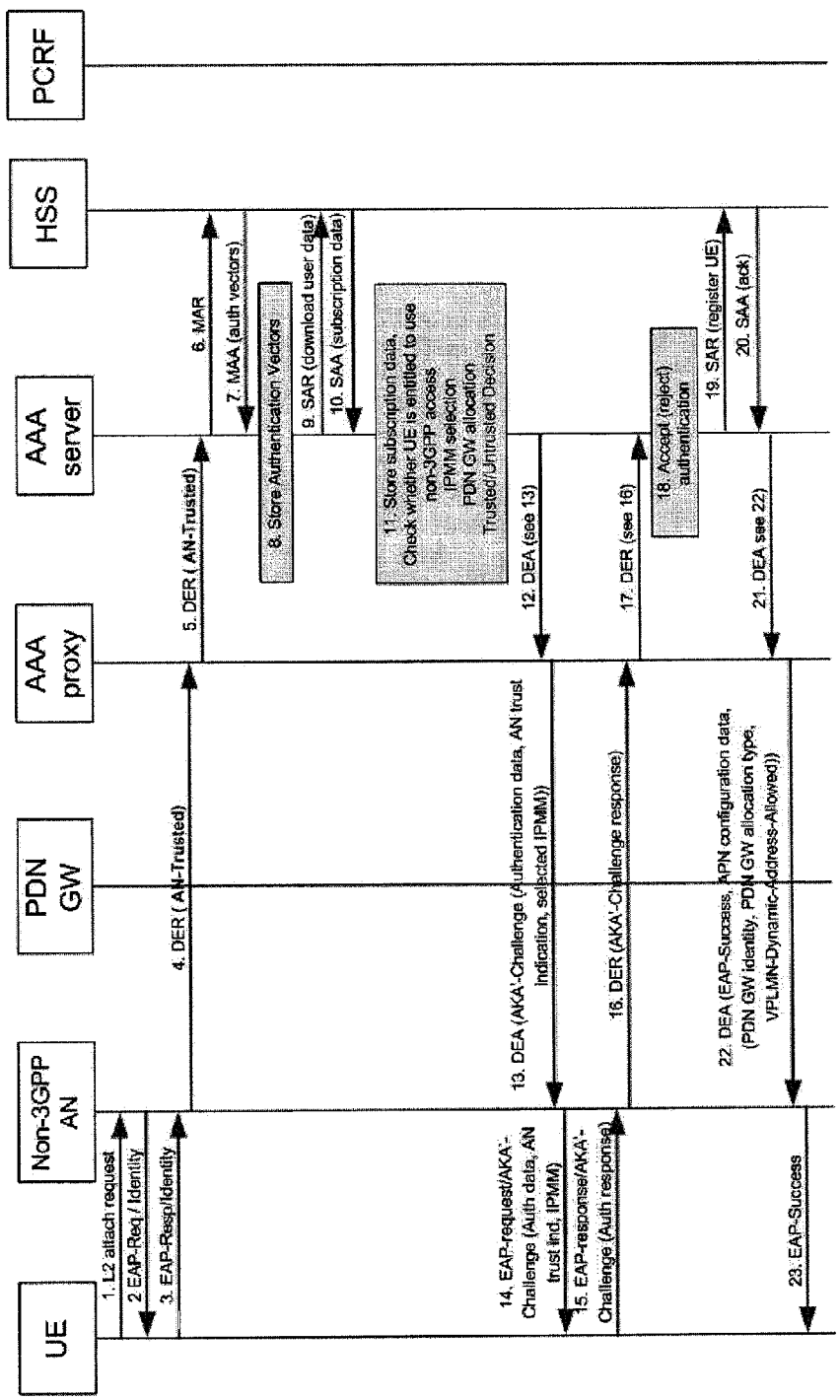
FIG. 5 shows a message flow diagram of an access authentication procedure in the network configuration of any one of FIGS. 1 to 4 according to an exemplary embodiment of the present invention.

FIG. 5 shows a message flow diagram of an access authentication procedure in the network configuration of any one of FIGS. 1 to 4 according to an exemplary embodiment of the present invention. For the following description, it is exemplary assumed that the potentially trusted non-3GPP access network supports the EAP-AKA' authentication over the STa interface, as it is supposed to be for most of non-3GPP access networks that shall be handled as trusted by a 3GPP network.

Namely, FIG. 5 shows details for an access authentication and authorization for an initial attach to a non-3GPP access network for a roaming case, using the STa and SWd interface. In the following, those aspects of the thus depicted access authentication are described in more details, which are relevant for embodiments of the present invention. For further details on the message contents and the actions executed by the individual network elements, reference is made to clause 5 of 3GPP TS 29.273 and clause 6.2 of TS 33.402.

The following description applies to procedures involving the STa interface, for which the use of EAP-AKA' is mandatory. (Note that the dotted lines in FIGS. 3 and 4 are not relevant here.)

In step 1, a connection is established between the user equipment UE and a "potentially trusted" non-3GPP access network (the decision is made during this process, see below), using a procedure specific to the non-3GPP access network (which is out of scope here). A roaming case is assumed here, i.e. the user is roaming in a foreign network. Therefore, the access network is connected to a visited network VPLMN (a roaming partner of the home network HPLMN). In step 2, an authenticator in the trusted non-3GPP access network sends an EAP Request/Identity to the UE. In step 3, the UE sends an EAP Response/Identity message, including a network access identifier (NAI). In step 4, the trusted non-3GPP access network generates a Diameter authentication and authorization request for EAP (e.g. DER: Diameter EAP Request) and includes (among others) the EAP response, the access type and the identity of the access network. The request is routed towards the proper AAA Proxy (i.e. to a proper VPLMN), based on the realm part of the NAI. In step 5, the AAA proxy shall include the visited network identifier (identifying the VPLMN) in the DER request.

According to embodiments of the present invention, the 3GPP AAA Proxy (in the VPLMN) provisionally determines the trustworthiness of the access network concerned, i.e. evaluates the trust relationship between the non-3GPP access network and the VPLMN. To this end, it uses the assumption that the PDN gateway shall be allocated in the VPLMN (due to the LBO scenario), while taking into account all information on the access network which is available in the VPLMN, e.g. the security level of the IP link between the access network and the VPLMN or the radio access technology (RAT) in the access network. The decision factors may be configured as part of the local policies in the AAA Proxy in the VPLMN. The result, i.e. the trusted/untrusted decision for the VPLMN shall be added to the forwarded DER request. This may be implemented by way of a specifically assigned attribute-value pair AVP (which could for example be denoted as "AN-Trusted AVP", wherein the possible values are "Trusted" and "Untrusted"). The DER request is then routed via the SWd interface to the proper 3GPP AAA Server in the HPLMN based on the realm part of the NAI.

In step 6, after the 3GPP AAA Server received the DER request that contains the EAP Response/Identity message, the subscriber identity and the radio access technology (RAT) over the SWd interface, it checks whether it has an unused authentication vector for EAP-AKA' and, if not, a set of new authentication vectors is retrieved from the home subscriber server HSS. In steps 7 to 10, the HSS generates authentication vectors and sends them to the 3GPP AAA server, the AAA Server stores the authentication vectors (if more then one was requested/received), the AAA Server retrieves the subscription data of the user, and the HSS sends the subscription data.

In step 11, the 3GPP AAA Server verifies that the subscriber is authorized to use the evolved packet system (EPS) and the non-3GPP access network. If the user is authorized, then, based on the received indicators (from the user equipment and the access network) and the subscription data (i.e. whether a fixed PDN GW is assigned to the UE, PDN GW allocation in the VPLMN is allowed or not), the AAA Server decides about the trustworthiness of the access network in question.

According to embodiments of the present invention, the 3GPP AAA Server in the HPLMN decides—for each subscribed access point name (APN) of the user—whether local breakout or home routing is to be used. It may allocate a PDN GW for (some of) the access point names. And, according to embodiments of the present invention, the 3GPP AAA Server in the HPLMN decides about whether the access network is to be handled as trusted or untrusted, i.e. about the final trustworthiness thereof.

To this end, the 3GPP AAA Server takes the VPLMN's provisional trustworthiness decision, i.e. the trustworthiness indication received from the VPLMN decision (e.g. the value of the AN-Trusted AVP) into consideration.

If local breakout is to be used for all access point names of the user, the AAA Server accepts the VPLMN's provisional decision in terms of technical decision factors. It may still decide for the access network being "untrusted", if there is a specific business-related (i.e. administrative) reason for doing so (e.g. due to previous subscriber complaints, limited trust with the VPLMN, etc.), but it shall not decide for the access network being "trusted", if the VPLMN indicated an "untrusted" state.

If home routing is to be used for all access point names of the user, the AAA Server shall not take into consideration the received VPLMN's provisional trust indication (because the relevant IP link shall be between the AN and the HPLMN, and not the VPLMN). That is, the VPLMN's provisional decision is discarded in this case, and a decision is made at the AAA Server in the home network on its own.

If LBO is allowed for some of the access point names of the user, but home routing is requested for access point names of the user, there are several options.

According to a first option, the AAA server makes sub-decisions separately for the local breakout and the home routing cases, i.e. for those access point names for which local breakout or home routing is applicable, which is accomplished as described above for the respective special cases, and then combines them into a single, joint decision for both groups. Namely, it decides for "trusted", only if both sub-decisions are "trusted". This option leads to the use of an evolved packet data gateway (ePDG) for all packet data network connections of the user in question, if this is needed at least for some access point names.

According to a second option, the AAA Server makes separate decisions for the local breakout and the home routing cases, i.e. for those subscribed access point names for which local breakout or home routing is applicable, which is accomplished as described above for the respective special cases. Then, if these decisions are different, the AAA Server indicates to the user equipment UE, for which access point names the access network is to be handled as trusted and for which access point names the access network is to be handled as untrusted.

For those subscribed access point names, for which the access network was decided to be trusted, the UE may send PDN connection requests to the non-3GPP gateway (if PMIP is used) or directly to the PDN GW (if DS-MIPv6 is used). In order to request PDN connections for any of those APNs, for which the access network was decided to be untrusted, the UE shall firstly set up a tunnel to an ePDG, and then a corresponding PDN connection request shall be sent via this tunnel.

For this option, either a new attribute needs to be defined, or the syntax of the AT_TRUST_IND attribute needs to be extended so as to allow sending a list of access point names with respective trust indications.

In the context of the present invention and embodiments thereof, an access point name (APN) identifies a service provided by a packet data network, and is independent of the access network as such or any access point in the sense of an interface provided by an access network. A user's subscription profile, as stored in the HLR, contains data like the authorization to invoke some services (i.e. connect to some PDNs), and also whether for these, the LBO or home routing is to be used.

In step 12, the 3GPP AAA Server sends an EAP-AKA' authentication request (EAP Request/AKA'-Challenge message) included in a Diameter EAP Answer (e.g. DEA: Diameter EPA Answer) request. The 3GPP AAA Server informs the UE about the trust status of the access network in the AT_TRUST_IND attribute included in the EAP Request/AKA'-Challenge message. In step 13, the AAA proxy forwards the request to the non-3GPP AN, including an AKA' challenge. In step 14, the authenticator in the access network sends the EAP Request/AKA'-Challenge message to the UE. In step 15, the UE (the USIM (Universal Subscriber Identity Module) application) authenticates the network, computes the authentication response value and sends it in an EAP-Response message. In step 16, the authenticator in the access network sends the EAP Response/AKA'-Challenge packet to 3GPP AAA Proxy. In step 17, the AAA Proxy forwards the request to the AAA Server. In step 18, the AAA Server compares the received authentication result with the expected result (received within the authentication vector) and considers the authentication as successful, if they are equal. In step 19, if the authentication was successful, the AAA Server registers the user in the HSS. In step 20, the HSS acknowledges that the UE was registered. In step 21, the AAA Server sends a final DEA answer (indicating successful completion of the Diameter authentication process), including (among others) all the relevant APN-related data (which contains the PGN GW identity, if the AAA Server allocated a PDN GW or received it from the HSS, or if no PDN GW identity is sent, an indicator, whether the non-3GPP GW may allocate a PDN GW in the VPLMN, the selected IP mobility mode and EAP-Success information) to the AAA Proxy. In step 22, the AAA Proxy forwards the DEA request to the non-3GPP access network. In step 23, the authenticator in the access network informs the UE about the successfully completed authentication.

Subsequent steps after the access authentication (as described above) depend on the mobility mode and the trust indication as received by the UE. In particular, the UE shall act according to the received trusted/untrusted indication when requesting a PDN connection, as is detailed below.

As regards user traffic, if the STa interface and the EAP-AKA' authentication mechanism are used for authentication, the interface used for the user plane can be the S2a interface (when the decision is trusted and PMIP is used) or the S2b interface (when the decision is untrusted and PMIP is used; then, the UE shall need to set up a secure channel to the ePDG) or also the S2c interface (when DSMIP is used; the packets are sent to the PDN GW either directly—in case of trusted access—or through the ePDG—in case of untrusted access).

Above, an access authentication for an initial attach to an access network has been described in detail. The access authentication to be executed in case of a handover to a non-3GPP access network is similar to that for the initial attach. In fact, the differences (e.g. some PDN gateways may have already been allocated before the handover, and the AAA Server receives them from the HSS) do not need any different behavior in the particular operations according to embodiments of the present invention.

It is noted that the above-described scenarios using the STa interface build upon the assumption that the user equipment learns whether it is connected to a trusted access network before it initiates a setup of a PDN connection, e.g. by creating a DS-MIPv6 binding to the PDN gateway. In this regard, it is assumed that a trusted access network supports EAP, which is the pre-requisite for the use of EAP-AKA' between user equipment and AAA server.

However, if certain conditions are met, 3GPP standards allow that a non-3GPP access network can be trusted also without supporting EAP methods and specifically, EAP-AKA' (as has been assumed above). For this type of (potentially) trusted access networks, only host-based mobility is applicable, and the STa interface is not applicable for authentication. For this specific type of non-3GPP access networks, the UE will not be informed about the trustworthiness of the non-3GPP access network and unless it has preconfigured information about the specific access network to be handled as trusted, it shall treat it (at least initially, until it gains such information) as untrusted. For this case, the first alternative described above cannot be used; a specific solution, which is described in the following, is needed.

As a second alternative in line with the present invention, embodiments of the present invention may be implemented using a new path for the authentication messaging, as presented as thick dotted line in FIGS. 3 and 4.

In both of these figures, there is illustrated a thick dotted line ranging from the user equipment to the 3GPP AAA Server in the home network, passing through a trusted access network as well as the evolved packet data gateway ePDG and the 3GPP AAA Proxy in the visited network. This thick dotted line represents a specific message route according to embodiments of the present invention. Namely, according to exemplary embodiments for the special case of a trusted non-3GPP access network without EAP support, the trusted non-3GPP access gateway may be connected (at least temporarily, for the authentication) with the ePDG.

The above-mentioned special case builds the basis for the present second alternative in line with the present invention. Namely, the following scenarios build upon the assumption that a non-3GPP access network is trusted, but does not support EAP, and the UE has no preconfigured information about the access network to be handled as trusted. For this specific case, the UE shall initiate the setup of a secure tunnel to an ePDG, before requesting any PDN connection. In fact, the UE does so, while it is attached to a trusted—or at least "potentially trusted"—non-3GPP access network. This results in the communication path represented by the thick dotted line in FIGS. 3 and 4.

Figure 6:
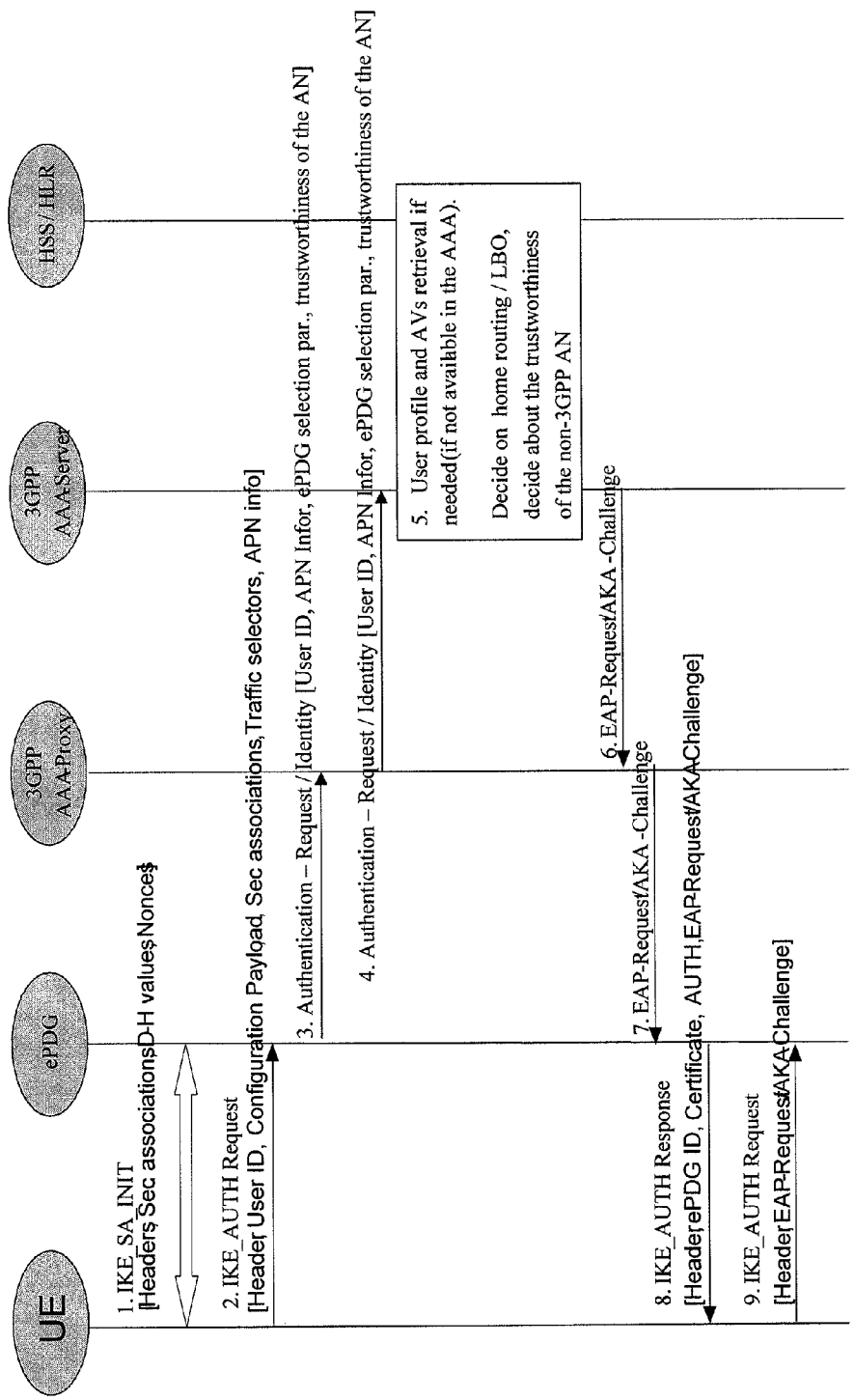
FIG. 6 shows a message flow diagram of an access authentication procedure in the network configuration of any one of FIG. 3 or 4 according to an exemplary embodiment of the present invention.

FIG. 6 shows a message flow diagram of an access authentication procedure in the network configuration of any one of FIGS. 3 and 4 according to an exemplary embodiment of the present invention, when this new communication path is used.

FIG. 6 shows details for an access authentication and authorization for an initial attach to a non-3GPP access network, which is equally applicable for a handover. In the following, those aspects of the thus depicted access authentication are described in more details, which are relevant for embodiments of the present invention. For further details on the message contents and the actions executed by the individual network elements, reference is made to clause 8.2.2 of 3GPP TS 33.402.

In step 1, the UE and the ePDG exchange the first pair of messages, known as IKE_SA_INIT, in which the ePDG and UE negotiate cryptographic algorithms, exchange nonces and perform a Diffie_Hellman exchange. In step 2, the UE sends the user identity and the APN information in this first message of the IKE_AUTH phase, and begins negotiation of child security associations. The UE omits the AUTH parameter in order to indicate to the ePDG that it wants to use EAP over IKEv2 (Internet Key Exchange version 2). The user identity shall be compliant with Network Access Identifier (NAI) format, containing the IMSI or the pseudonym. The UE shall send the configuration payload (CFG_REQUEST) within the IKE_AUTH request message to obtain a remote IP Address. In steps 3 and 4, the ePDG sends the Authentication Request message with an EAP AVP to the 3GPP AAA Server via the 3GPP AAA Proxy, containing the user identity, APN information, an ePDG selection parameter, and a (provisional) trustworthiness indication of the access network in question. The ePDG shall include a parameter indicating that the authentication is being performed for tunnel establishment with an ePDG. This will help the 3GPP AAA Server distinguish among authentications for trusted access or tunnel setup for I-WLAN (Interworking Wireless Local Area Network).

According to embodiments of the present invention, in step 3, the ePDG (in the VPLMN) provisionally determines the trustworthiness of the access network concerned, i.e. evaluates the trust relationship between the non-3GPP access network and the VPLMN. To this end, it uses the assumption that the PDN gateway shall be allocated in the VPLMN (due to the LBO scenario), while taking into account all information on the access network which is available in the VPLMN, e.g. the security level of the IP link between the access network and the VPLMN or the radio access technology (RAT) in the access network. The decision factors may be configured as part of the local policies in the ePDG in the VPLMN. The result, i.e. the trusted/untrusted decision for the VPLMN shall be added to the forwarded (DER) authentication request. This may be implemented by way of a specifically assigned attribute-value pair AVP (which could for example be denoted as "AN-Trusted AVP", wherein the possible values are "Trusted" and "Untrusted"). The (DER) authentication request is then routed to the proper 3GPP AAA Proxy, which in turn forwards it to the 3GPP AAA Server in the HPLMN based on the realm part of the NAI.

In step 5, the 3GPP AAA Server shall fetch the user profile and authentication vectors from the home subscriber server HSS and/or home location register HLR (if these parameters are not available in the 3GPP AAA Server). The 3GPP AAA Server shall include the parameter received in step 4 indicating that the authentication is being performed for tunnel establishment with an ePDG in the request to the HSS. The HSS shall then generate authentication vectors with AMF separation bit=0 and send them back to the 3GPP AAA server. The 3GPP AAA server shall also fetch the user profile (if it is not yet available there) and, based on that, it shall decide for each subscribed APN (access point name) of the user, whether home routing or local breakout is to be used, i.e. whether the PDN gateway can be allocated in the VPLMN or HPLMN. Subsequent to that, if the AAA server has received information from the ePDG that the access network is trusted by the VPLMN, the AAA server shall decide about the access network to be handled as trusted or untrusted. (Note that without receiving the trust indication from the VPLMN, no such decision is needed, as the access network is always considered to be untrusted if the ePDG is involved in the access authentication.)

According to embodiments of the present invention, the 3GPP AAA Server in the HPLMN decides about whether the access network is to be handled as trusted or untrusted, i.e. about the final trustworthiness thereof.

To this end, the 3GPP AAA Server takes the VPLMN's provisional trustworthiness decision, i.e. the trustworthiness indication received from the VPLMN decision (e.g. the value of the AN-Trusted AVP) into consideration. Similar to the above alternative using the STa interface, it is distinguished between the three cases that local breakout is to be used for all access point names, home routing is to be used for all access point names, and LBO is allowed for some of the access point names of the user, but home routing is requested for access point names of the user. Also the decision making and the feasible options are similar to those described above in connection with the STa interface. Thus, details (cf. step 11 according to FIG. 5) are not repeated here for the sake of brevity.

After the AAA server has determined that the access network is trusted indeed (this means trusted for all APNs for the first option, or at least for some of the subscribed APNs for the second option), the AAA server shall include the AT_TRUST_IND attribute (or, in case of the second option, the new attribute, if that will be used for encoding the decision) in the EAP Request/AKA-Challenge message.

In step 6, the 3GPP AAA Server initiates the authentication challenge. The user identity is not requested again. The trust indication as determined above is included in the request. In step 7, the 3GPP AAA Proxy forwards the request to the ePDG. In step 8, the ePDG responds to the UE with its identity, a certificate, and sends the AUTH parameter to protect the previous message it sent to the UE (in the IKE_SA_INIT exchange). It completes the negotiation of the child security associations as well. The EAP message received from the 3GPP AAA Server (EAP-Request/AKA-Challenge) is included in order to start the EAP procedure over IKEv2. In step 9, the UE checks the authentication parameters and responds to the authentication challenge. The only payload (apart from the header) in the IKEv2 message is the EAP message.

For the first option, if the UE receives the EAP Request/AKA-Challenge message with the AT_TRUST_IND attribute included and indicating that the access network is trusted, the UE may decide to abort the IKEv2 procedure. If the UE aborts the IKEv2 procedure, the UE shall then initiate a DS-MIPv6 binding to the PDN gateway, without involving the ePDG. Otherwise, the UE continues with the standard procure which is omitted from FIG. 6.

For the second option, if the UE receives the EAP-Request/AKA-challenge message with the AT_TRUST_IND attribute (or the relevant new attribute if that is chosen for encoding the access network trust indication) included and indicating that the access network is trusted for some of the subscribed APNs but not for all of them, the UE shall complete the IKEv2 authentication procedure and set up a secure tunnel to the ePDG. Subsequent to that, the UE shall behave for each APN specifically. When the UE initiates a setup of PDN connections to an APN, for which the access network was indicated as untrusted, the UE shall set up a DS-MIPv6 binding to the PDN gateway via the ePDG (i.e. use the secure tunnel). When the UE initiates a setup of a PDN connection to an APN, for which the AN was indicated as trusted, the UE may set up a DS-MIPv6 binding to the PDN gateway directly, without involving the ePDG.

In fact, the ePDG may have several sources available to decide whether an access network should be considered trusted e.g. the security level of the IP link between the access network and the VPLMN or the radio access technology in the access network. The decision factors shall be configured as part of the local policies in the ePDG. This is similar to the process described for the AAA proxy in the case of the S2a interface, with the ePDG here taking the role of the AAA proxy.

As regards user traffic, if the STa interface and the EAP-AKA' authentication mechanism are not used for authentication, the interface used for the user plane can be the S2c interface going directly to the PDN GW, if the final trustworthiness decision is "trusted", or via the ePDG, if the final trustworthiness decision is "untrusted". If a separate decision is made for the APNs yielding local breakout and those yielding home routing, the S2c interface shall have different paths for these groups of APNs.

While alternatives and embodiments of the present invention have previously been described from an overall system's point of view, while specifically considering the interworking between individual entities, details about the individual methods and entities will be described herein below.

Figure 7:
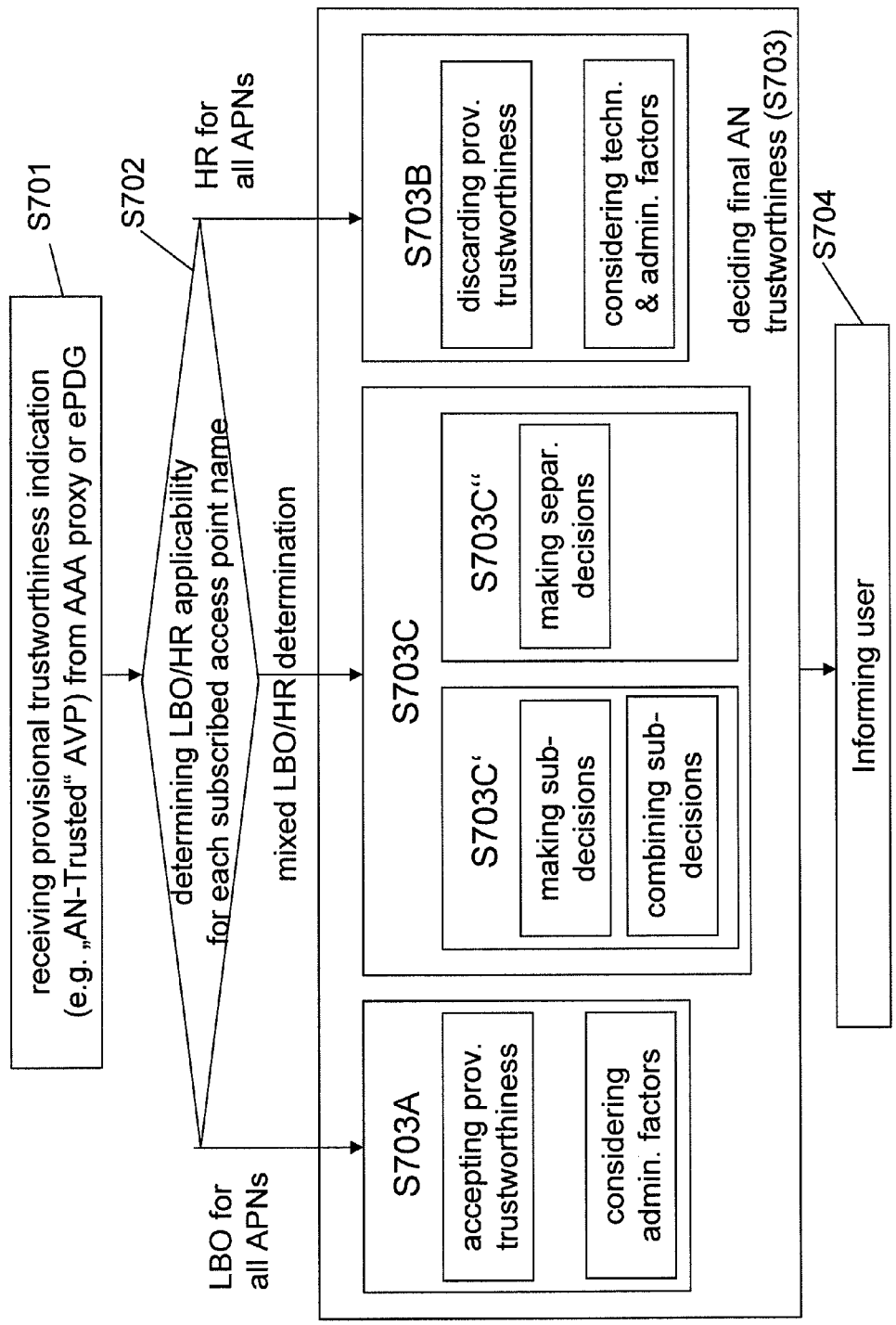
FIG. 7 shows a schematic flow chart of a method being executable at a home network entity according to an exemplary embodiment of the present invention.

FIG. 7 shows a schematic flow chart of a method being executable at a home network entity according to an exemplary embodiment of the present invention. The home network entity executing the thus depicted method may for example be a 3GPP AAA server, as depicted in FIGS. 1 to 4 above. The thus depicted method is operable upon initial attach at or handover to a certain access network in question.

According to the method of FIG. 7, in operation S701, the 3GPP AAA Server receives an indication about a provisional trustworthiness of an access network, which provides packet data access for a roaming user, with respect to a visited network of said user from a non-3GPP access network, either via a 3GPP AAA proxy (using the STa and SWd interfaces, as presented in FIGS. 1 to 4) or via an ePDG (using the communication path represented by the dotted line in FIGS. 3 and 4). This indication may for example be included in a Diameter Extensible Authentication Protocol request. Then, in operation S702, the applicability of local breakout or home routing for each subscribed access point name of said user is determined. In operation S703, a decision is made about a final trustworthiness of said access network based upon the received provisional trustworthiness indication and the determined routing applicability for each access point name of the user in question.

In operation S703, when the determining yields the applicability of local breakout for all subscribed access point names of the user in question, the decision making (in operation S703A) further comprises accepting the provisional trustworthiness of said access network in terms of technical decision factors, and considering administrative decision factors, if any, for making an ultimate decision about the final trustworthiness of said access network.

In operation S703, when the determining yields the applicability of home routing for all subscribed access point names of the user in question, the decision making (in operation S703B) further comprises discarding the provisional trustworthiness of said access network with respect to said visited network, and considering technical and, if any, administrative decision factors with respect to a home network of said user for making an ultimate decision about the final trustworthiness of said access network.

In operation S703, when the determining yields the applicability of local breakout for some of the subscribed access point names of the user in question and the applicability of home routing for other subscribed access point names of the user in question, the decision making (in operation S703C) further comprises one of the following two options. In a first option (in operation S703C') sub-decisions for those subscribed access point names yielding the applicability of local breakout and for those access point names yielding the applicability of home routing are made, the sub-decisions made for both groups of access point names are combined such that said access network is decided to be finally trustworthy, when both groups of access point names are decided to be trustworthy. In a second option (in operation S703C") separate decisions for those access point names yielding the applicability of local breakout and for those access point names yielding the applicability of home routing are made.

Subsequently, the user is informed about the decisions of final trustworthiness of said access network (in operation S704). Here, either a general trustworthiness information is provided (in case of S703A, S703B or S703C') or specific/separated information in respect to the individual subscribed access point names (in case of S703C"). If separate decisions are made for APNs yielding the applicability of local breakout and the APNs yielding home routing, the user is informed about these separate decisions about final trustworthiness of the access network, e.g. by way of a list of the access point names. This may for example be accomplished by using a correspondingly modified syntax of a AT_TRUST_IND attribute, or by using a specifically designated attribute.

Figure 8:
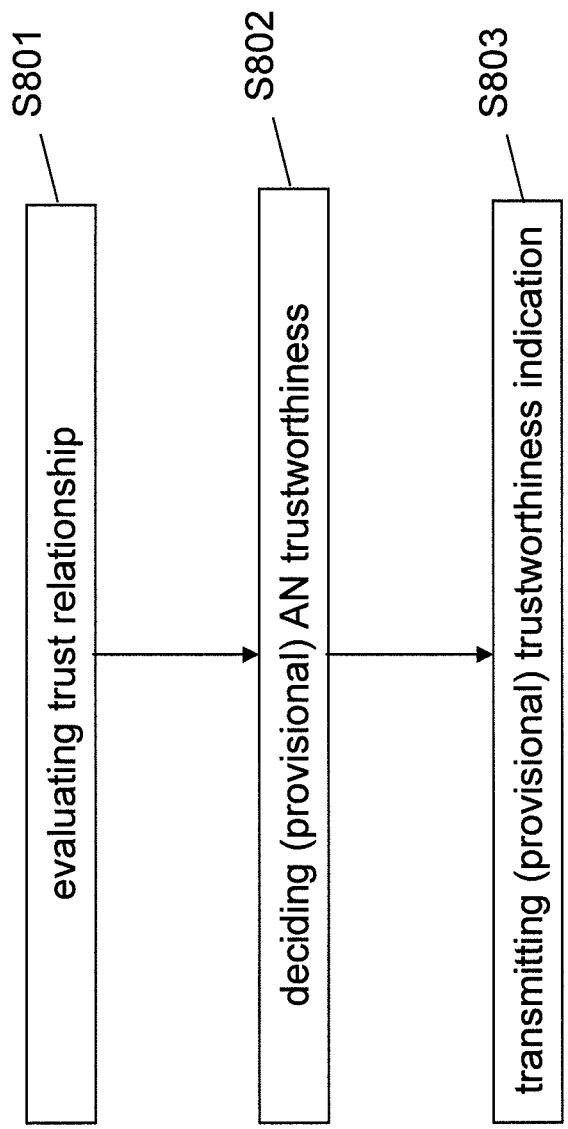
FIG. 8 shows a schematic flow chart of a method being executable at a visited network entity according to an exemplary embodiment of the present invention.

FIG. 8 shows a schematic flow chart of a method being executable at a visited network entity according to an exemplary embodiment of the present invention. The visited network entity executing the thus depicted method may for example be a 3GPP AAA proxy, as depicted in FIGS. 1 to 4 above, or an ePDG, as depicted in FIGS. 3 and 4 above. The thus depicted method is operable upon initial attach at or handover to a certain access network in question.

According to the method of FIG. 8, in operation S801, the AAA proxy (in the case of the first alternative, presented in FIGS. 1 to 5) or the ePDG (in the case of the second alternative, presented in FIGS. 3, 4 and 5) evaluates a trust relationship between an access network, which provides packet data access for a roaming user, and a visited network of said user by taking into account available decision factors for trustworthiness. Then, in operation S802, a decision is made about a trustworthiness of said access network with respect to said visited network based upon the evaluated trust relationship. In operation S803, an indication about said decided trustworthiness is transmitted to a responsible network element of a home network of said user, e.g. an 3GPP AAA Server according to any one of FIGS. 1 to 4. The transmission of the indication may be performed in a Diameter Extensible Authentication Protocol request.

Figure 9:
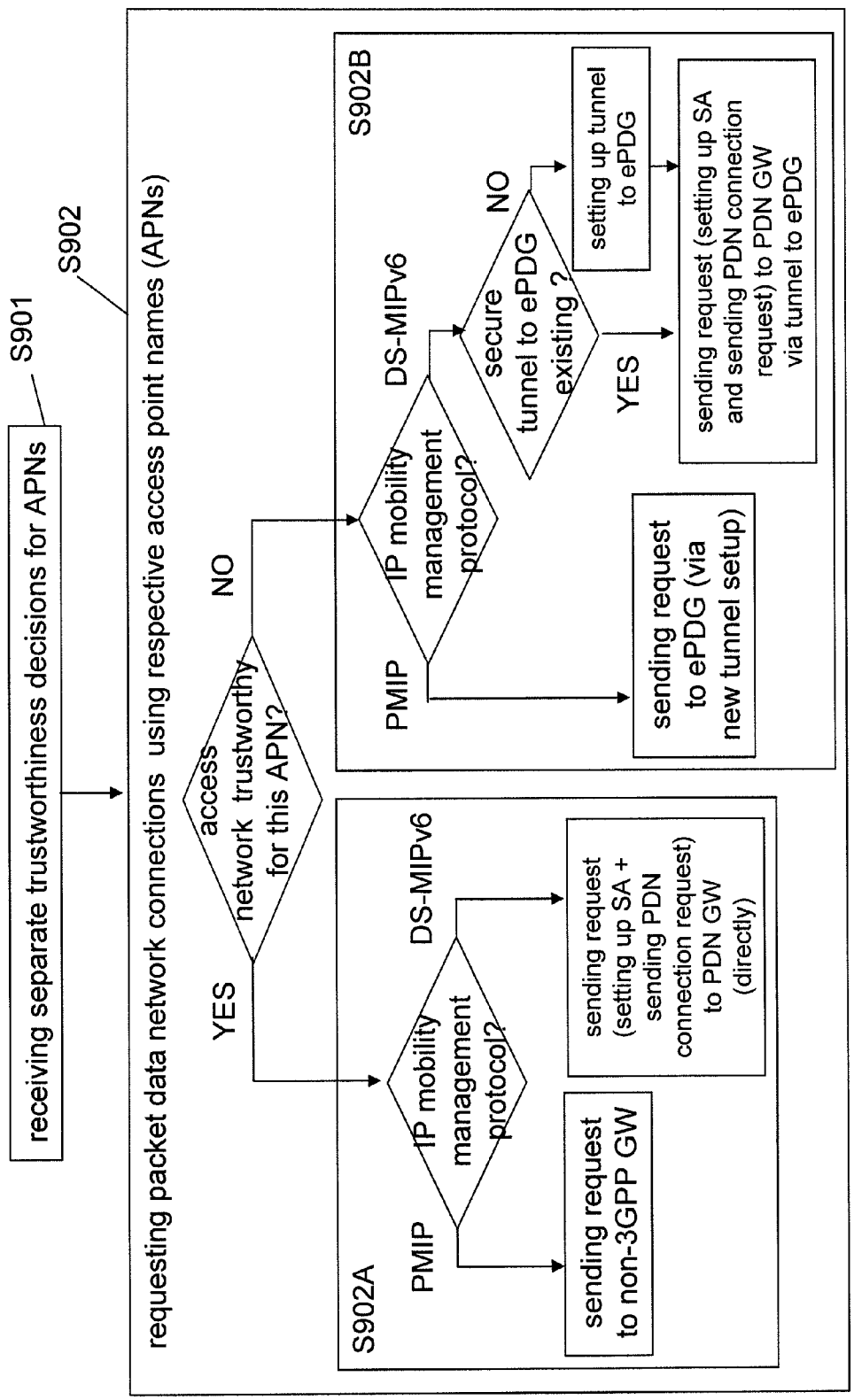
FIG. 9 shows a schematic flow chart of a method being executable at a user equipment according to an exemplary embodiment of the present invention.

FIG. 9 shows a schematic flow chart of a method being executable at a user equipment according to an exemplary embodiment of the present invention. The user equipment executing the thus depicted method may for example be a UE, as implicit to FIGS. 1, 2 above, or as depicted in FIGS. 3 and 4 above. The thus depicted method is operable when the home network entity executes the second option for the case that the applicability of local breakout for some of the subscribed access point names of said user and the applicability of home routing for other subscribed access point names of said user is determined (i.e. operation S703C" according to FIG. 7 above).

According to the method of FIG. 9, in operation S901, the user equipment receives information about separate decisions of trustworthiness of the non-3GPP access network, which provides packet data access for a roaming user, with respect to each individual subscribed access point name of the user in question from a network element of a home network of said user, e.g. a 3GPP AAA server. Then, in operation S902, packet data network connections are requested using the respective access point name, depending on the received trustworthiness of the access network, regarding the individual access point names.

In operation S902, the requesting of packet data network connections comprises for access point names, for which the access network was indicated to be trustworthy (in operation S902A), sending a packet data network (PDN) connection request to a non-3GPP gateway, if Proxy Mobile Internet Protocol is used, or setting up a security association and sending a PDN connection request to a packet data network gateway, if Dual-Stack Mobile Internet Protocol version 6 is used. For access point names, for which the access network was indicated to be non-trustworthy (in operation S902B), the requesting of packet data network connections comprises setting up a tunnel to an evolved packet data gateway (ePDG) and sending a packet data network connection (PDN) request via said tunnel to said evolved packet data gateway, if PMIP is used, or setting up a security association and sending a PDN connection request to the packet data network gateway via a secure tunnel to an ePDG (after a tunnel setup to ePDG, as necessary), if DSMIPv6 is used.

It is noted that in case of DSMIP and untrusted access, there needs to be only one tunnel to the ePDG and this shall be set up before sending the first binding request to a PDN gateway. For PMIP, a separate tunnel is created for each PDN connection/access point name.

As depicted in FIG. 9, respective operations for distinguishing between the above-outlined cases may be explicitly carried out, such as for distinguishing between non-/trustworthiness for certain access point names, PMIP or DSMIPv6 usage (i.e. the IP mobility management protocol used), and the non-/existence of a secure tunnel to an ePDG (i.e. the need for setting up such a tunnel).

Although in the foregoing embodiments of the present invention have been described mainly with reference to methods, procedures and functions, corresponding embodiments of the present invention also cover respective apparatuses, network nodes, including both software and/or hardware thereof.

Respective exemplary embodiments of the present invention are described below referring to FIGS. 10 to 12, while for the sake of brevity reference is made to the detailed description of respective corresponding methods and operations according to FIGS. 5 to 9, respectively.

Figure 10:
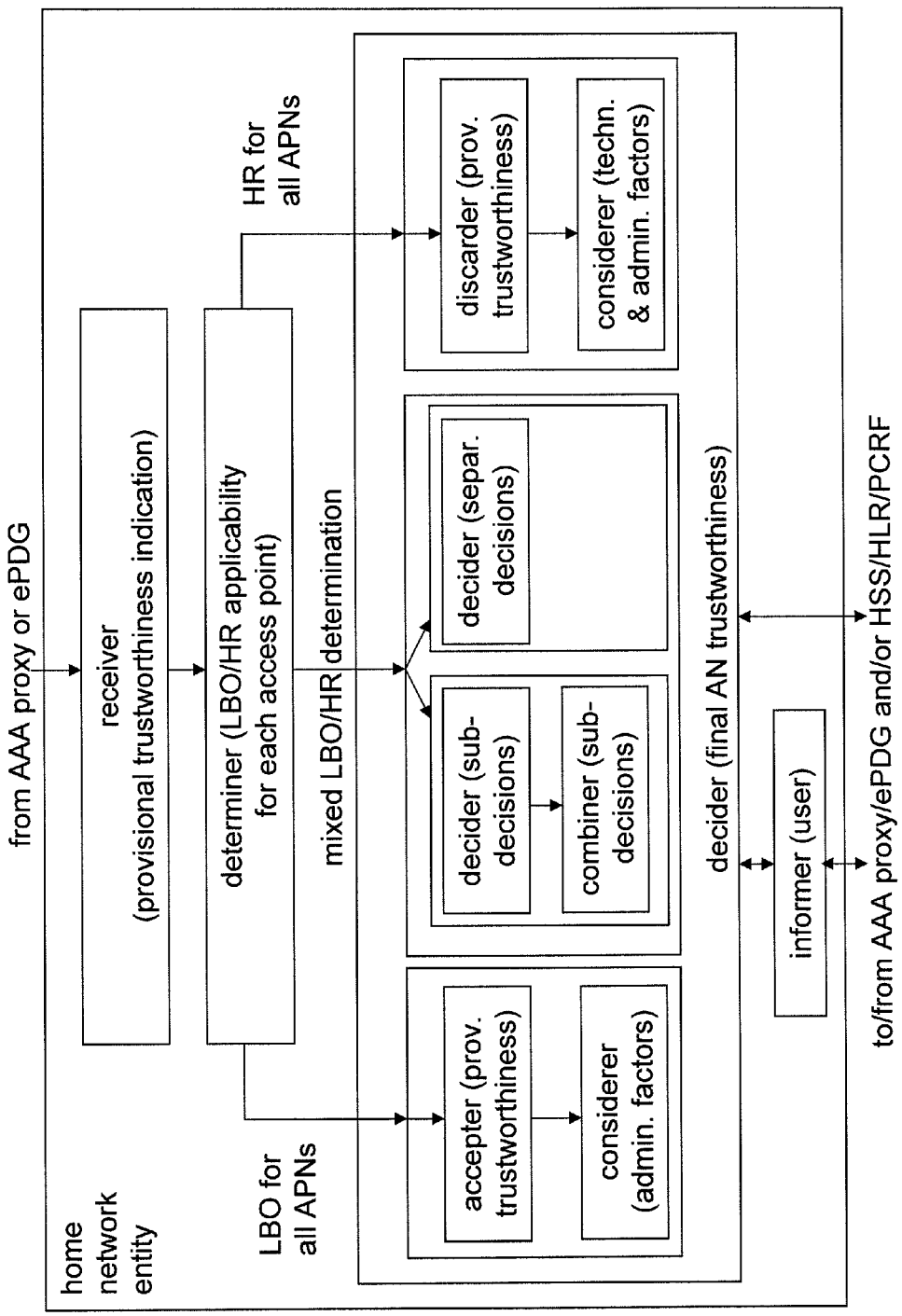
FIG. 10 shows a schematic block diagram of a home network entity according to an exemplary embodiment of the present invention.
Figure 11:
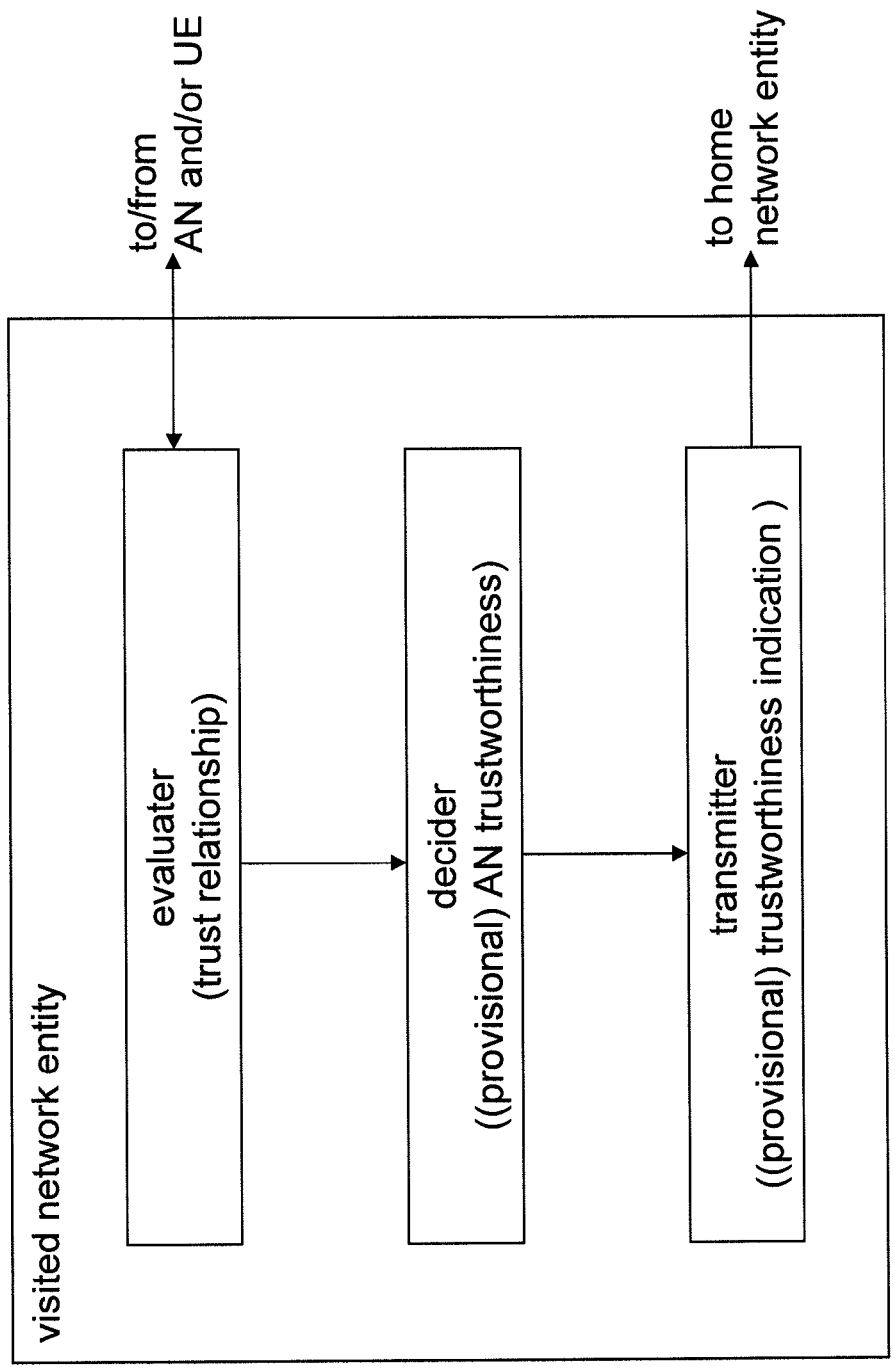
FIG. 11 shows a schematic block diagram of a visited network entity according to an exemplary embodiment of the present invention.
Figure 12:
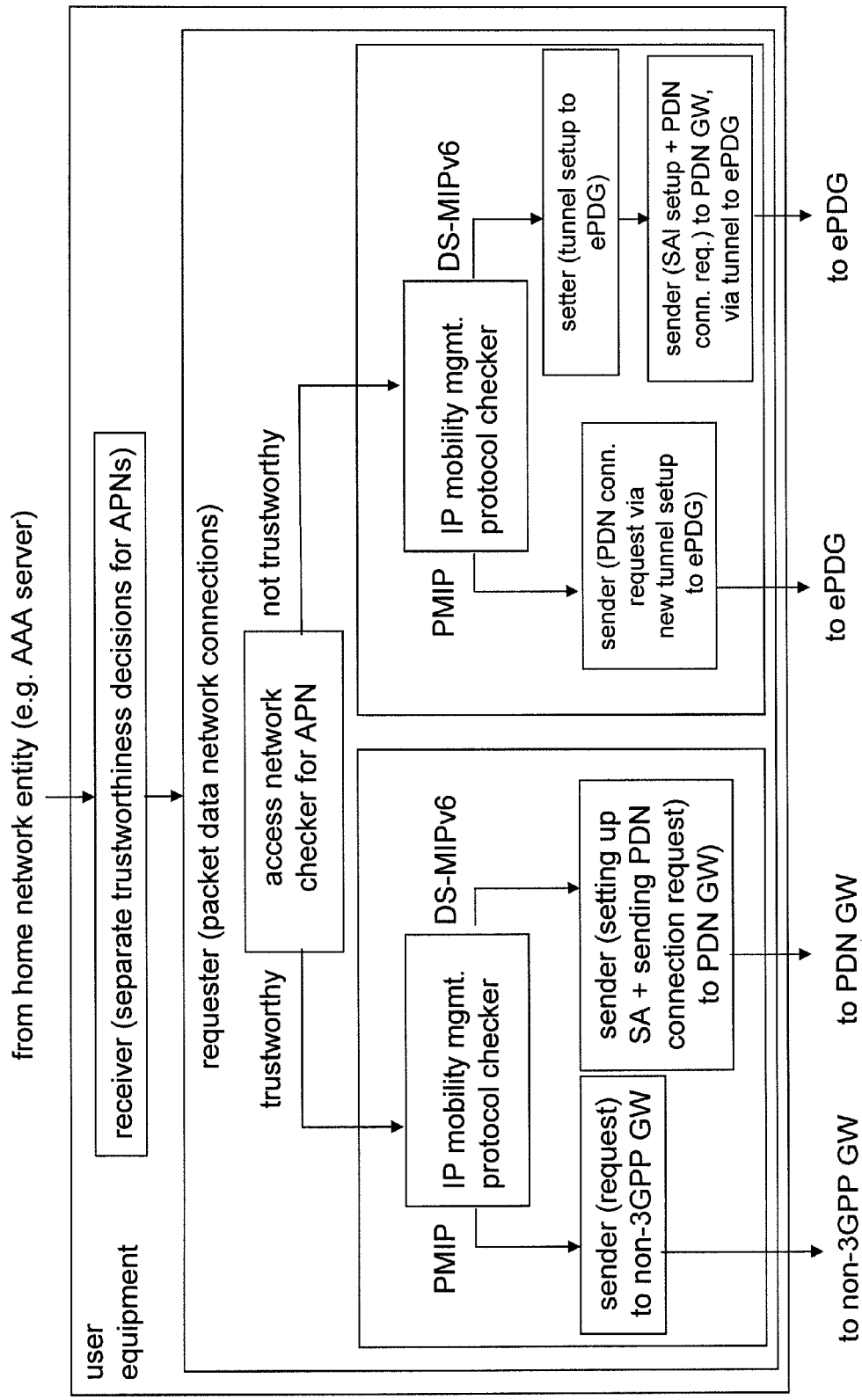
FIG. 12 shows a schematic block diagram of a user equipment according to an exemplary embodiment of the present invention.

In FIGS. 10 to 12 below, the solid line blocks are basically configured to perform the basic operations. The entirety of solid line blocks are basically configured to perform the methods and operations as described above, respectively. With respect to FIGS. 10 to 12, it is to be noted that the individual blocks are meant to illustrate respective functional blocks implementing a respective function, process or procedure, respectively. Such functional blocks are implementation-independent, i.e. may be implemented by means of any kind of hardware or software, respectively. The lines/arrows interconnecting individual blocks are meant to illustrate an operational coupling there-between, which on the one hand is implementation-independent (e.g. wired or wireless) and on the other hand may also comprise an arbitrary number of intermediary functional entities not shown.

Further, in FIGS. 10 to 12, only those functional blocks are illustrated, which relate to any one of the above-described methods, procedures and functions. A skilled person is deemed to acknowledge the presence of any other conventional functional blocks required for an operation of respective structural arrangements, such as e.g. a power supply, a central processing unit, respective memories or the like.

FIG. 10 shows a schematic block diagram of a home network entity according to an exemplary embodiment of the present invention. The thus depicted apparatus of a home network entity may for example be implemented as or in a 3GPP AAA server, as depicted in FIGS. 1 to 4 above.

According to the exemplary embodiment depicted in FIG. 10, the thus depicted apparatus of a home network entity comprises a receiver, a determiner, and a decider.

Stated in general terms, the receiver represents means for receiving an indication about a provisional trustworthiness of an access network with respect to a visited network of a user from a network element of said visited network (e.g. an AAA proxy or ePDG). The determiner represents means for determining the applicability of local breakout (LBO) or home routing (HR) for each subscribed access point name of said user. The decider represents means for deciding about a final trustworthiness of said access network based upon the received provisional trustworthiness indication from said receiver and the determined routing applicability for each subscribed access point name from said determiner.

The decider according to the embodiment of FIG. 10 basically comprises three units, namely one for the determination that local breakout is applicable for all subscribed access point names of said user, one for the determination that home routing is applicable for all subscribed access point names of said user, and one for the determination that local breakout is applicable for some of the subscribed access point names of said user and home routing is applicable for other subscribed access point names of said user.

For the first-mentioned case, the decider is configured to accept the provisional trustworthiness of said access network in terms of technical decision factors (by means of an accepter), and to consider administrative decision factors, if any, for making an ultimate decision about the final trustworthiness of said access network (by means of a considerer).

For the second-mentioned case, the decider is configured to discard the provisional trustworthiness of said access network with respect to said visited network (by means of a discarder), and to consider technical and, if any, administrative decision factors with respect to a home network of said user for making an ultimate decision about the final trustworthiness of said access network (by means of a considerer).

For the third-mentioned case, the decider is configured to operate in one of two optional ways. On the one hand, the decider may be configured to make sub-decisions for those subscribed access point names of said user yielding the applicability of local breakout and for those subscribed access point names of said user yielding the applicability of home routing (by means of a (sub-) decider), and to combine the sub-decisions made for both groups of access point names such that said access network is decided to be finally trustworthy, when the access network is decided to be trustworthy for both groups of access point names (by means of a combiner). On the other hand, the decider may be configured to make separate decisions for those subscribed access point names of said user yielding the applicability of local breakout and for those access point names of said user yielding the applicability of home routing (by means of a (sub-) decider).

The user is informed about the final trustworthiness decision via an informer. If the decider is configured to make separate decisions for APNs yielding the applicability of local breakout and the APNs yielding home routing, the informer is capable of informing the user about these separate decisions about final trustworthiness of the access network, e.g. by way of a list of the access point names. This may for example be accomplished by using a correspondingly modified syntax of a AT_TRUST_IND attribute, or by using a specifically designated attribute.

The thus depicted apparatus of a home network entity comprises an interface to a visited network entity (e.g. AAA proxy or ePDG depending on the underlying network configuration). It may further comprise an interface to another home network entity (e.g. HSS, HLR, PCRF (Policy Charging Rules Function)).

FIG. 11 shows a schematic block diagram of a visited network entity according to an exemplary embodiment of the present invention. The thus depicted apparatus of a visited network entity may for example be implemented as or in a 3GPP AAA proxy, as depicted in FIGS. 1 to 4 above, or an ePDG, as depicted in FIGS. 3 and 4 above.

According to the exemplary embodiment depicted in FIG. 11, the thus depicted apparatus of a visited network entity comprises an evaluator, a decider, and a transmitter.

Stated in general terms, the evaluator represents means for evaluating a trust relationship between an access network and a visited network of a user by taking into account available decision factors for trustworthiness. The decider represents means for deciding about a trustworthiness of said access network with respect to said visited network based upon the evaluated trust relationship. The transmitter represents means for transmitting an indication about said decided trustworthiness to a network element of a home network of said user.

The thus depicted apparatus of a visited network entity comprises an interface to a home network entity (e.g. AAA server). It further comprises an interface to the relevant access network and/or the user equipment in question.

FIG. 12 shows a schematic block diagram of a user equipment according to an exemplary embodiment of the present invention. The thus depicted apparatus of a user equipment may for example be implemented as or in a UE, as implicit to FIGS. 1, 2 above, or as depicted in FIGS. 3 and 4 above.

According to the exemplary embodiment depicted in FIG. 12, the thus depicted apparatus of a user equipment comprises a receiver and a requester.

Stated in general terms, the receiver represents means for receiving information about separate decisions of trustworthiness of individual access point names of a user in question, which provides packet data access for a roaming user, from a network element of a home network of said user (e.g. AAA server). The requester represents means for requesting packet data network connections using the respective access point names depending on the received trustworthiness of the access network regarding that individual access point name.

The requester according to the embodiment of FIG. 12 is basically configured (by means of one or more respective senders) to send a PDN connection request to a non-3GPP gateway, if the access network was indicated to be trustworthy for the access point name in question and Proxy Mobile Internet Protocol is used as a protocol, and/or to set up a security association and send a PDN connection request to a packet data network gateway (directly, i.e. without involving an ePDG, if the access network was indicated to be trustworthy for the access point name in question and Dual-Stack Mobile Internet Protocol version 6 is used as IP mobility management protocol. The requester is also configured to request a packet data network connection via a new tunnel setup and authentication to the ePDG (by the means of a sender (and an optional setter)), if the access network was indicated to be not trustworthy regarding the access point name in question and PMIP is to be used, or to set up a tunnel to an ePDG, if such tunnel is not yet available, (by means of a setter) and subsequently to set up a secure association and to send a PDN connection request to a packet data network gateway via said tunnel to said ePDG (by means of a respective sender), if the access network was indicated to be not trustworthy regarding the access point name in question and DSMIPv6 is to be used.

For distinguishing the above-mentioned cases of network trustworthiness, the requester may comprise an access network checker for individual access point names representing means for checking the trustworthiness of the access network for the respective access point names in question. For distinguishing the above-mentioned cases of protocols being used, the requester may comprise an IP mobility management protocol checker representing means for checking whether Proxy Mobile Internet Protocol (PMIP) or Dual-Stack Mobile Internet Protocol version 6 (DS-MIPv6) is used as a protocol. It is noted that these protocols are mentioned as non-limiting examples, while any other protocols may be equally used, as far as applicable for underlying network configurations. For distinguishing the above-mentioned cases of the non-/existence of a tunnel to a relevant ePDG, the requester may comprise (although not depicted) a tunnel checker representing means for checking whether or not a secure tunnel to an evolved packet gateway is already existing.

The thus depicted apparatus of a visited network entity comprises an interface to a home network entity (e.g. AAA server). It further comprises an interface to at least one of the above-mentioned non-3GPP gateway, PDN gateway, and ePDG for sending PDN and/or tunnel setup requests to an appropriate destination.

Any one of the above-outlined apparatuses represents an autonomous entity according to respective embodiments of the present invention, while their interworking entirety or any conceivable combination thereof represents a system according to respective embodiments of the present invention.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for trustworthiness decision making for access authentication, for example relating to the trustworthiness of non-3GPP access networks within a 3GPP-compliant packet data system, exemplary comprising receiving an indication about a provisional trustworthiness of an access network, which provides packet data access for a roaming user, with respect to a visited network of said user from a network element of said visited network, determining the applicability of local breakout or home routing for each subscribed access point name of said user, and deciding about a final trustworthiness of said access network based upon the received provisional trustworthiness indication and the determined routing applicability for each subscribed access point name of said user.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

We claim:

1. A method comprising:
    receiving an indication about a provisional trustworthiness of an access network, which provides packet data access for a roaming user, with respect to a visited network of said user from a network element of said visited network, said user having a plurality of subscribed access point names,
    determining the applicability of local breakout for at least some of the subscribed access point names of said user, and
    deciding about a final trustworthiness of said access network based upon the received provisional trustworthiness indication and the determined applicability of local breakout for the at least some of the subscribed access point names of said user.

2. The method according to claim 1, wherein said receiving of the provisional trustworthiness indication comprises receiving an attribute in an authentication request, which is configured to indicate the provisional trustworthiness of said access network.

3. The method according to claim 2, wherein the authentication request comprises a Diameter Extensible Authentication Protocol request.

4. The method according to claim 1, wherein said determining yields the applicability of local breakout for all subscribed access point names of said user, said deciding further comprising:
accepting the provisional trustworthiness of said access network in terms of technical decision factors, and
considering administrative decision factors, if any, for making an ultimate decision about the final trustworthiness of said access network.

5. The method according to claim 1, wherein said determining yields the applicability of home routing for all subscribed access point names of said user, said deciding further comprising:
discarding the provisional trustworthiness of said access network with respect to said visited network, and
considering technical and, if any, administrative decision factors with respect to a home network of said user for making an ultimate decision about the final trustworthiness of said access network.

6. The method according to claim 4, wherein said decision factors comprise technical decision factors including one or more of a radio access technology of said access network and a security level of a link between said access network and said visited network of said user, as well as administrative decision factors including one or more of the existence of a roaming agreement between said access network and said home network, a trust level between said visited network and said home network, previous experience on service quality.

7. The method according to claim 1, wherein said determining yields the applicability of local breakout for some of the subscribed access point names of said user and the applicability of home routing for other subscribed access point names of said user, said deciding further comprising:
making sub-decisions for those subscribed access point names yielding the applicability of local breakout and for those subscribed access point names yielding the applicability of home routing, and
combining the sub-decisions made for both groups of access point names such that said access network is decided to be finally trustworthy, when said access network has been decided to be trustworthy for both groups of access point names.

8. The method according to claim 1, wherein said determining yields the applicability of local breakout for some of the subscribed access point names of said user and the applicability of home routing for other subscribed access point names of said user, said deciding further comprising:
making separate decisions for those subscribed access point names yielding the applicability of local breakout and for those subscribed access point names yielding the applicability of home routing, and
informing the user about the separate decisions of final trustworthiness of the access network with regard to the individual subscribed access point names of said user.

9. The method according to claim 1, wherein
said network element of said visited network comprises an authentication, authorization and accounting proxy entity, and/or
packet data access is provided via an interface between said access network and a packet data network gateway, and/or
IP mobility management is provided using Proxy Mobile Internet Protocol or Dual-Stack Mobile IP version 6.

10. The method according to claim 1, wherein
said network element of said visited network comprises an evolved packet data gateway, and/or
packet data access is provided via an interface between said user and a packet data network gateway, and/or
IP mobility management is provided using Dual-Stack Mobile Internet Protocol version 6.

11. The method according to claim 1, wherein said method is operable upon initial attach at or handover to said access network.

12. The method according to claim 1, wherein said visited network and a home network of said user belong to an evolved packet system in accordance with 3GPP specifications, and said access network is a non-3GPP access network.

13. The method according to claim 1, wherein said method is operable at an authentication, authorization and accounting server in said home network of said user.

14. A method comprising:
receiving information about separate decisions of trustworthiness of an access network, which provides packet data access for a roaming user, regarding individual subscribed access point names of said user, from a network element of a home network of said user, and
requesting packet data network connections using respective access point names depending on the received trustworthiness of the access network regarding the individual subscribed access point names.

15. The method according to claim 14, said requesting further comprising:
for access point names, for which an indication is received that the access network can be considered as trustworthy, sending a packet data network connection request to a non-3GPP gateway, if Proxy Mobile Internet Protocol is used, or setting up a security association and sending a packet data network connection request to a packet data network gateway, if Dual-Stack Mobile Internet Protocol version 6 is used, and/or
for access point names, for which an indication is received that the access network is to be considered as non-trustworthy, sending packet data network connection requests embedded into a secure tunnel setup to an evolved packet gateway, if Proxy Mobile Internet Protocol is used, and/or setting up a tunnel to an evolved packet data gateway and setting up a security association and sending a packet data network connection request to a packet data network gateway via said tunnel to said evolved packet data gateway, if Dual-Stack Mobile IP version 6 is used.

16. The method according to claim 14, wherein said network element of said home network comprises an authentication, authorization and accounting server.

17. The method according to claim 14, wherein said method is operable at a user equipment of said user.

18. An apparatus comprising:
a receiver configured to receive an indication about a provisional trustworthiness of an access network, which provides packet data access for a roaming user, with respect to a visited network of said user from a network element of said visited network, said user having a plurality of subscribed access point names, a determiner configured to determine the applicability of local breakout for at least some of the subscribed access point names of said user, and a decider configured to decide about a final trustworthiness of said access network based upon the received provisional trustworthiness indication and the determined applicability of local breakout for the at least some of the subscribed access point names of said user.

19. An apparatus comprising:

a receiver configured to receive information about separate decisions of trustworthiness of an access network, which provides packet data access for a roaming user, regarding individual subscribed access point names of said user from a network element of a home network of said user, and a requester configured to request packet data network connections using respective access point names depending on the received trustworthiness of the access network regarding the individual subscribed access point name.

20. A computer program product comprising a non-transitory computer-readable storage medium bearing computer program code embodied therein being arranged, when run on a processor of an apparatus, to perform the method according to claim 1.

21. A method comprising:

receiving a decision of final trustworthiness of an access network which provides packet data access for a roaming user, the roaming user having a plurality of subscribed access point names, the final trustworthiness having been decided by a home network and based upon a provisional trustworthiness indication of the access network with respect to a visited network visited by the roaming user provided by the visited network and a determined applicability of local breakout for at least some of subscribed access point names of the roaming user; and requesting at least one packet data network connection depending on the received decision of final trustworthiness of the access network.

22. A user equipment comprising:

a receiver configured to receive a decision of final trustworthiness of an access network which provides packet data access for the user equipment roaming in a visited network, the user equipment having a plurality of subscribed access point names, the final trustworthiness having been decided by a home network and based upon a provisional trustworthiness indication of the access network with respect to the visited network provided by the visited network and a determined applicability of local breakout for at least some of subscribed access point names of the user equipment; and a requester configured to request at least one packet data network connection depending on the received decision of final trustworthiness of the access network.

* * * * *